(12) United States Patent
Shimizu et al.

(10) Patent No.: US 11,670,901 B2
(45) Date of Patent: Jun. 6, 2023

(54) ELECTRICAL CONTACT DEVICE AND ROTATING ELECTRIC MACHINE INCLUDING THE ELECTRICAL CONTACT DEVICE

(71) Applicant: DENSO CORPORATION, Kariya (JP)

(72) Inventors: Shingo Shimizu, Kariya (JP); Takahiro Nozu, Kariya (JP); Yoshihiro Adachi, Kariya (JP); Tetsuya Honda, Kariya (JP)

(73) Assignee: DENSO CORPORATION, Kariya (JP)

( * ) Notice: Subject to any disclaimer, the term of this patent is extended or adjusted under 35 U.S.C. 154(b) by 524 days.

(21) Appl. No.: 16/657,097

(22) Filed: Oct. 18, 2019

(65) Prior Publication Data
US 2020/0127427 A1    Apr. 23, 2020

(30) Foreign Application Priority Data

Oct. 22, 2018 (JP) .............................. JP2018-198129
Sep. 12, 2019 (JP) .............................. JP2019-166599

(51) Int. Cl.
*H01R 39/02* (2006.01)
*H02K 13/06* (2006.01)
(Continued)

(52) U.S. Cl.
CPC ........... *H01R 39/025* (2013.01); *H01H 50/54* (2013.01); *H01R 39/04* (2013.01); *H01R 39/20* (2013.01);
(Continued)

(58) Field of Classification Search
CPC ...... H01R 39/025; H01R 39/04; H01R 39/20; H01R 39/26; H01R 39/46; H01R 39/54;
(Continued)

(56) References Cited

U.S. PATENT DOCUMENTS 2,406,262 A * 8/1946 Stauffer ............... H01R 39/025
                                                            420/475
3,171,997 A * 3/1965 Hammer ............... H01R 39/18
                                                            310/233
(Continued)

FOREIGN PATENT DOCUMENTS

EP        2020710 A1    2/2009
JP       S55-053155 A   4/1980
(Continued)

OTHER PUBLICATIONS

Boiling temperatures for some metals (Year: 2007).*

*Primary Examiner* — Ahmed Elnakib
(74) *Attorney, Agent, or Firm* — Harness, Dickey & Pierce, P.L.C.

(57) ABSTRACT

An electrical contact device includes a high electric potential-side contact and a low electric potential-side contact having a lower electric potential than the high electric potential-side contact. The high electric potential-side contact and the low electric potential-side contact are configured to be brought into and out of contact with each other. At least one of the high electric potential-side contact and the low electric potential-side contact is formed of a low-boiling point material whose boiling point is lower than 2562° C. or a mixed material that contains the low-boiling point material.

20 Claims, 26 Drawing Sheets

(51) Int. Cl.
*H02K 13/10* (2006.01)
*H01H 50/54* (2006.01)
*H01R 39/20* (2006.01)
*H01R 39/26* (2006.01)
*H01R 39/46* (2006.01)
*H01R 39/04* (2006.01)

(52) U.S. Cl.
CPC ............ *H01R 39/26* (2013.01); *H01R 39/46* (2013.01); *H02K 13/06* (2013.01); *H02K 13/105* (2013.01); *H01H 2201/026* (2013.01); *H01H 2201/038* (2013.01)

(58) Field of Classification Search
CPC ...... H01R 39/388; H01R 39/38; H01R 39/24; H01R 39/22; H01R 39/27; H01R 39/36; H01R 39/385; H01R 39/386; H01H 50/54; H01H 2201/026; H01H 2201/038; H01H 1/02; H01H 50/546; H02K 13/06; H02K 13/105; H02K 13/10; H02K 13/00; H02K 5/146; H02K 13/006
USPC .................................................. 310/239–253
See application file for complete search history.

(56) References Cited

U.S. PATENT DOCUMENTS

| | | | | |
|---|---|---|---|---|
| 3,191,084 | A * | 6/1965 | Ooka | H02K 13/006 |
| | | | | 310/252 |
| 3,617,785 | A * | 11/1971 | Kristiansen | H01R 39/025 |
| | | | | 252/514 |
| 5,270,504 | A * | 12/1993 | Grohs | H01R 39/20 |
| | | | | 200/269 |
| 6,815,862 | B2 * | 11/2004 | Inukai | H01R 39/22 |
| | | | | 310/252 |
| 11,296,575 | B1 * | 4/2022 | Kirk | H01R 39/24 |
| 2004/0174088 | A1 | 9/2004 | Inukai et al. | |
| 2005/0006976 | A1 | 1/2005 | Someya et al. | |
| 2010/0084941 | A1 * | 4/2010 | Miyajima | H02K 13/04 |
| | | | | 29/598 |
| 2012/0326081 | A1 * | 12/2012 | Kagawa | H01R 39/025 |
| | | | | 252/182.32 |
| 2018/0062338 | A1 * | 3/2018 | Huber | C08K 3/046 |
| 2020/0127427 | A1 * | 4/2020 | Shimizu | H01H 50/54 |

FOREIGN PATENT DOCUMENTS

| | | |
|---|---|---|
| JP | H04-046546 A | 2/1992 |
| JP | H05-168200 A | 7/1993 |
| JP | H06-070511 A | 3/1994 |
| JP | 2000-004564 A | 1/2000 |
| JP | 2001-126838 A | 5/2001 |
| JP | 2002-171724 A | 6/2002 |
| JP | 2004-119203 A | 4/2004 |
| JP | 2004119203 * | 4/2004 |
| JP | 2004-242383 A | 8/2004 |
| JP | 2005-051987 A | 2/2005 |
| JP | 2007-028841 A | 2/2007 |
| JP | 2007-181318 A | 7/2007 |
| JP | 2009-051227 A | 3/2009 |
| JP | 2009-131120 A | 6/2009 |
| JP | 2009-177884 A | 8/2009 |
| JP | 2010-200569 A | 9/2010 |
| JP | 2010-233341 A | 10/2010 |
| JP | 2011-061976 A | 3/2011 |
| JP | 2011-205816 A | 10/2011 |
| JP | 2012-050193 A | 3/2012 |
| JP | 2013-034278 A | 2/2013 |
| JP | 2014-171304 A | 9/2014 |
| JP | 2014-195395 A | 10/2014 |
| JP | 2014-197490 A | 10/2014 |
| JP | 2014-209823 A | 11/2014 |
| JP | 2014-234710 A | 12/2014 |
| JP | 2015-180181 A | 10/2015 |
| JP | 2016-063624 A | 4/2016 |
| JP | 2016-135015 A | 7/2016 |
| JP | 2016-208644 A | 12/2016 |
| JP | 2017-005775 A | 1/2017 |
| JP | 2017-046472 A | 3/2017 |
| JP | 2017-070023 A | 4/2017 |
| JP | 2017-135163 A | 8/2017 |
| JP | 2017-135908 A | 8/2017 |
| JP | 2017-192233 A | 10/2017 |
| JP | 2019-022254 A | 2/2019 |
| JP | 2019-054698 A | 4/2019 |

* cited by examiner

ELECTRICAL CONTACT DEVICE AND ROTATING ELECTRIC MACHINE INCLUDING THE ELECTRICAL CONTACT DEVICE

CROSS-REFERENCE TO RELATED APPLICATIONS

This application is based on and claims priority from Japanese Patent Applications No. 2018-198129 filed on Oct. 22, 2018 and No. 2019-166599 filed on Sep. 12, 2019, the contents of which are hereby incorporated by reference in their entirety into this application.

BACKGROUND

1 Technical Field

The present disclosure relates to electrical contact devices and rotating electric machines that include the electrical contact devices.

2 Description of Related Art

There is known a technique of reducing electromagnetic noise generated with arc discharges occurring between commutator segments and brushes in a commutator motor, more particularly impulse electromagnetic noise generated when the arcs become extinguished. Specifically, according to the known technique, layers of zinc or a zinc alloy are formed in the commutator segments, thereby increasing the arc voltages.

SUMMARY

According to the present disclosure, an electrical contact device includes a high electric potential-side contact and a low electric potential-side contact having a lower electric potential than the high electric potential-side contact. The high electric potential-side contact and the low electric potential-side contact are configured to be brought into and out of contact with each other. At least one of the high electric potential-side contact and the low electric potential-side contact is formed of a low-boiling point material whose boiling point is lower than 2562° C. or a mixed material that contains the low-boiling point material.

DESCRIPTION OF EMBODIMENTS

Figure 1:
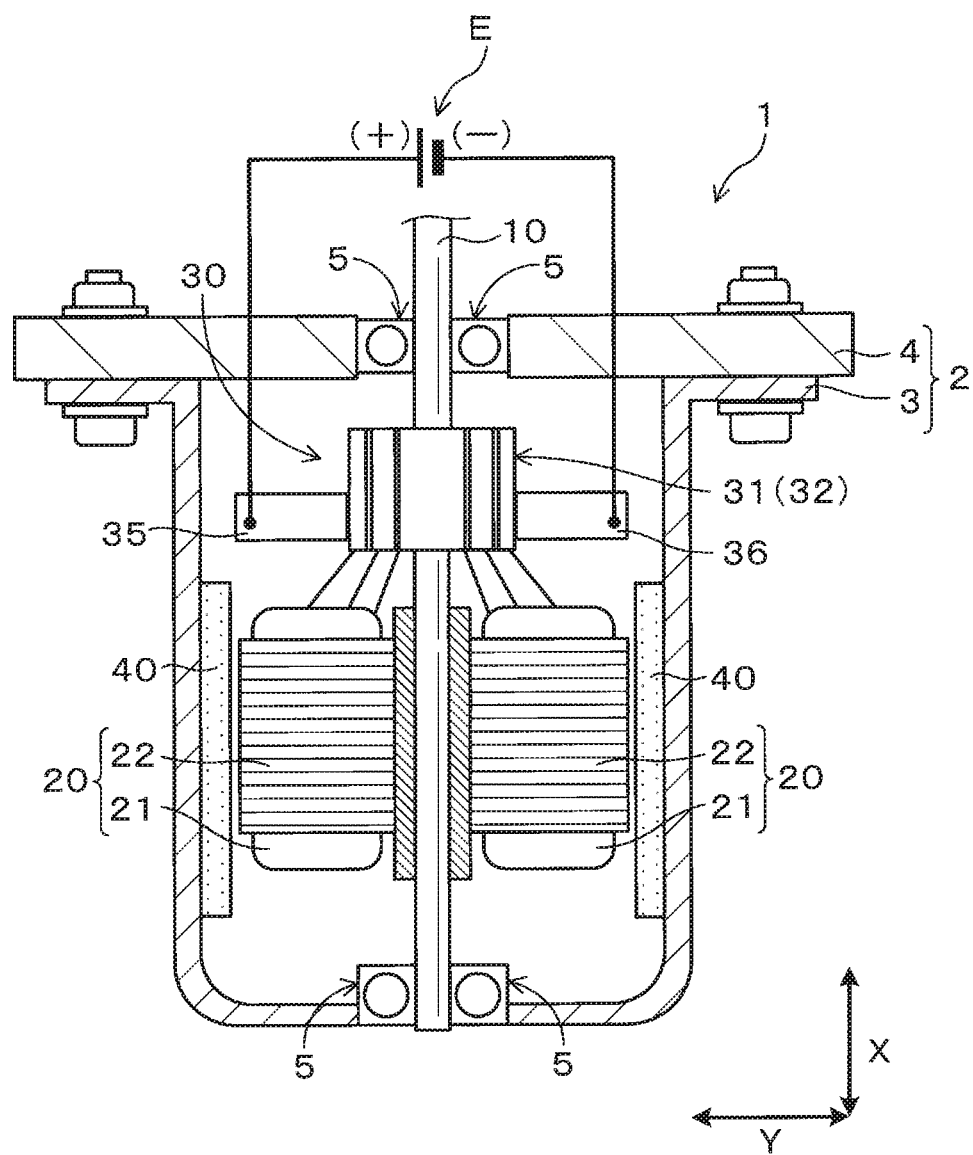
FIG. 1 is a schematic cross-sectional view, along an axial direction of a rotating shaft, of a rotating electric machine which includes an electrical contact device according to a first embodiment.

The effect of using the above-described known technique (see, for example, Japanese Patent Application Publication No. JP2002171724A) on the reduction of electromagnetic noise is lower in a high frequency band above 100 MHz than in a low frequency band. Therefore, in designing rotating electric machines, it is desirable to use a technique with which electromagnetic noise can be sufficiently reduced in a wide frequency band including a high frequency band as well as a low frequency band.

Moreover, the above problem may occur not only in rotating electric machines such as a commutator motor, but also in various other machines and devices (e.g., an electromagnetic relay) which include electrical contact devices where electromagnetic noise is generated with arc discharges.

In contrast, in the above-described electrical contact device according to the present disclosure, during arc discharges that occur when the high electric potential-side contact and the low electric potential-side contact are brought into and out of contact with each other, arcs are formed by the vapor of the low-boiling point material. The boiling point of the low-boiling point material contained in the at least one of the high electric potential-side contact and the low electric potential-side contact is lower than 2562° C., i.e., lower than the boiling point of copper. Therefore, compared to the case of the at least one of the high electric potential-side contact and the low electric potential-side contact being formed of copper, it is possible to increase the vapor density during the arc discharges, thereby suppressing the speed change of electrons. Consequently, it is possible to maintain the arcs for a longer time, thereby suppressing the rate of change of the arc voltages with time.

Moreover, impulse electromagnetic noise is generally generated at the start and at the end of an arc discharge. In contrast, burst electromagnetic noise is generally continuously generated during an arc discharge. The inventors of the present application investigated techniques for reducing burst electromagnetic noise focusing on the fact that in a high frequency band above 100 MHz, it is particularly easy for burst electromagnetic noise to increase.

As a result of the investigation, the inventors have found that by forming at least one of the high electric potential-side contact and the low electric potential-side contact with the low-boiling point material or the mixed material, it is possible to suppress, in particular in a high frequency band, the rate of change of the arc voltages with time over the discharge durations of the arc discharges, thereby effectively reducing burst electromagnetic noise. In addition, for each of the arc discharges, the discharge duration denotes the time period from the start to the end of the arc discharge.

Accordingly, in the electrical contact device according to the present disclosure, it is possible to sufficiently reduce, in a wide frequency band including a high frequency band as well as a low frequency band, electromagnetic noise generated during the arc discharges.

That is, according to the present disclosure, a technique is provided with which it is possible to sufficiently reduce, in a wide frequency band, electromagnetic noise generated during arc discharges in an electrical contact device.

Exemplary embodiments will be described hereinafter with reference to FIGS. 1-28. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine 1 which includes an electrical contact device 30 according to the first embodiment.

In the present embodiment, the rotating electric machine 1 is configured as an inner rotor motor. The rotating electric machine 1 can be used as a drive motor for driving various machines and devices, such as an in-vehicle device, a household appliance or an industrial machine. In addition, the rotating electric machine 1 may alternatively be configured as a motor-generator that selectively functions either as an electric motor or as an electric generator.

In the present embodiment, unless specified otherwise, an axial direction of a rotating shaft 10 of the rotating electric machine 1 is indicted by an arrow X; a radial direction of the rotating shaft 10 is indicated by an arrow Y; and a circumferential direction of the rotating shaft 10 is indicated by an arrow Z. In addition, a rotational direction of the rotating shaft 10, which is a direction toward one side in the circumferential direction Z, is indicated by an arrow Za (see FIG. 2).

The rotating shaft 10 is cylindrical in shape. The rotating shaft 10 is driven by electric power supplied from an electric power supply E to rotate in the rotational direction Za.

As shown in FIG. 1, the rotating electric machine 1 also includes a housing 2, which is composed of a case 3 and a cover 4, and a plurality of components for driving the rotating shaft 10 to rotate. These components are received in the housing 2.

Specifically, these components include bearings 5 for rotatably supporting the rotating shaft 10, a rotor 20, the electrical contact device 30 and a stator that includes a field magnet 40.

The rotor 20 is fixed on the rotating shaft 10 to rotate together with the rotating shaft 10. The rotor 20 includes a rotor core 21 and an armature coil 22. The rotor core 21 is formed by laminating a plurality of magnetic steel sheets. The armature coil 22 is wound on the rotor core 21.

The field magnet 40 is fixed on a radially inner surface of the case 3 to face the rotor 20 with a gap formed therebetween. The field magnet 40 functions to provide a magnetic field to the armature coil 22. In the present embodiment, the field magnet 40 is implemented by permanent magnets having different polarities (i.e., S and N poles).

The electrical contact device 30 is configured with a commutator 31 and a pair of first and second brushes 35 and 36.

Figure 2:
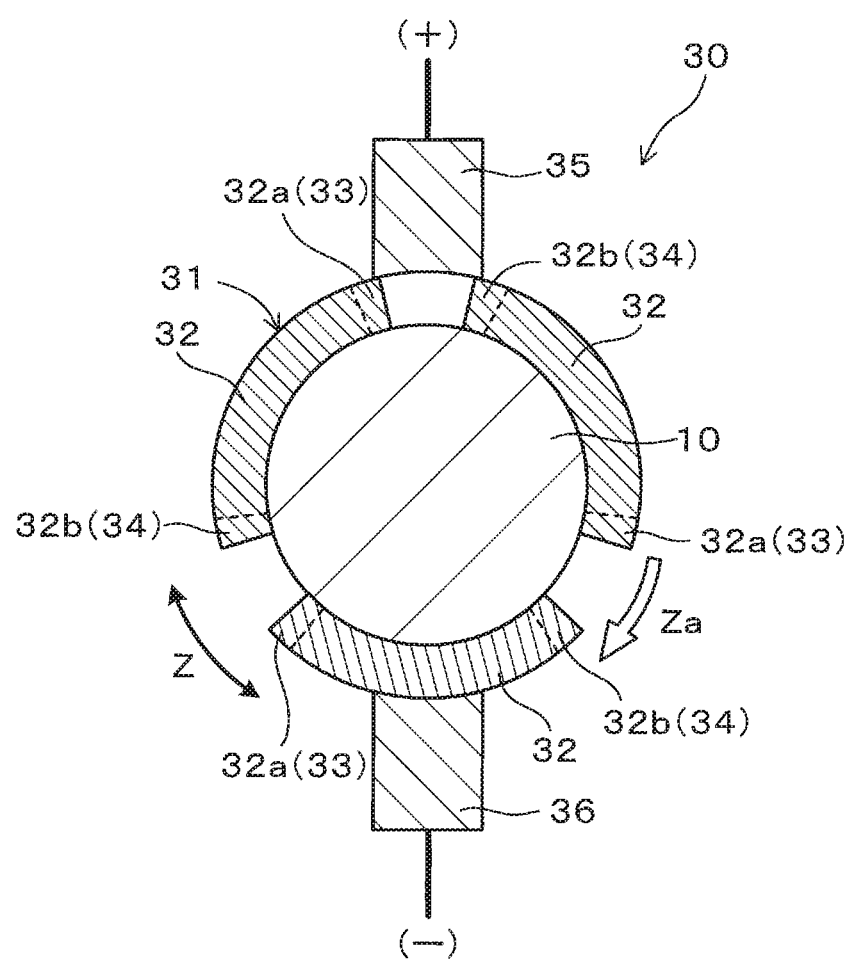
FIG. 2 is a schematic cross sectional view illustrating the configuration of the electrical contact device according to the first embodiment.

The commutator 31 is electrically connected with the armature coil 22 and configured to rotate with the rotating shaft 10 and the rotor 20. As shown in FIG. 2, the commutator 31 is comprised of a plurality of commutator segments 32 that are arranged in the circumferential direction Z of the rotating shaft 10. Each adjacent pair of the commutator segments 32 are spaced from each other in the circumferential direction Z and electrically connected with each other via the armature coil 22.

It should be noted that the number of the commutator segments 32 is not limited to a particular value, but may be set to any suitable value as needed. In addition, in FIG. 2, for the sake of simplicity, there are depicted only three commutator segments 32.

As shown in FIG. 2, each of the commutator segments 32 has a sliding-contact starting portion 33 and a sliding-contact finishing portion 34 with respect to each of the first and second brushes 35 and 36 during rotation of the commutator 31.

The sliding-contact starting portion 33 is a portion which is first brought into sliding contact with the first brush 35 or the second brush 36 in the commutator segment 32. As shown in FIG. 2, the sliding-contact starting portion 33 is constituted of a front end portion 32a of the commutator segment 32 in the rotational direction Za.

The sliding-contact finishing portion 34 is a portion which is finally brought out of sliding contact with the first brush 35 or the second brush 36 in the commutator segment 32. As shown in FIG. 2, the sliding-contact finishing portion 34 is constituted of a rear end portion 32b of the commutator segment 32 in the rotational direction Za.

Each of the first and second brushes 35 and 36 is substantially rectangular in shape. Moreover, each of the first and second brushes 35 and 36 is electrically connected with the electric power supply E and arranged to make sliding contact with each of the commutator segments 32 during rotation of the commutator 31. Specifically, the first brush 35 is electrically with a positive terminal of the electric power supply E while the second brush 36 is electrically connected with a negative terminal of the electric power supply E. Accordingly, the first brush 35 may also be referred to as positive brush 35 and the second brush 36 may also be referred to as negative brush 36. Moreover, the first and second brushes 35 and 36 are located so as to be offset from each other by 180° in the circumferential direction Z of the rotating shaft 10.

The first brush 35 is configured to be brought into and out of contact with the commutator segments 32. When the first brush 35 is in or out of contact with the commutator segments 32, the first brush 35 constitutes a high electric potential-side contact whereas the commutator segments 32 constitute low electric potential-side contacts; the high electric potential-side contact has a higher electric potential than the low electric potential-side contacts.

The second brush 36 is also configured to be brought into and out of contact with the commutator segments 32. When the second brush 36 is in or out of contact with the commutator segments 32, the second brush 36 constitutes a low electric potential-side contact whereas the commutator segments 32 constitute high electric potential-side contacts; the low electric potential-side contact has a lower electric potential than the high electric potential-side contacts.

As above, each of the commutator segments 32 may constitute a high electric potential-side contact or a low electric potential-side contact depending on its sliding-contact relationship with the first and second brushes 35 and 36. That is, in the electrical contact device 30 according to the present embodiment, the high electric potential-side and low electric potential-side contacts are constituted of the commutator segments 32 and the first and second brushes 35 and 36.

Moreover, in the present embodiment, all of the commutator segments 32 and the first and second brushes 35 and 36 are formed of zinc that is a low-boiling point material. The boiling point of zinc is 907° C. and thus lower than 2562° C. that is the boiling point of copper. Conventionally, brushes are generally formed of copper.

In addition, it should be noted that all of the commutator segments 32 and the first and second brushes 35 and 36 may be formed of zinc only or a mixed material that contains zinc.

Figure 3:
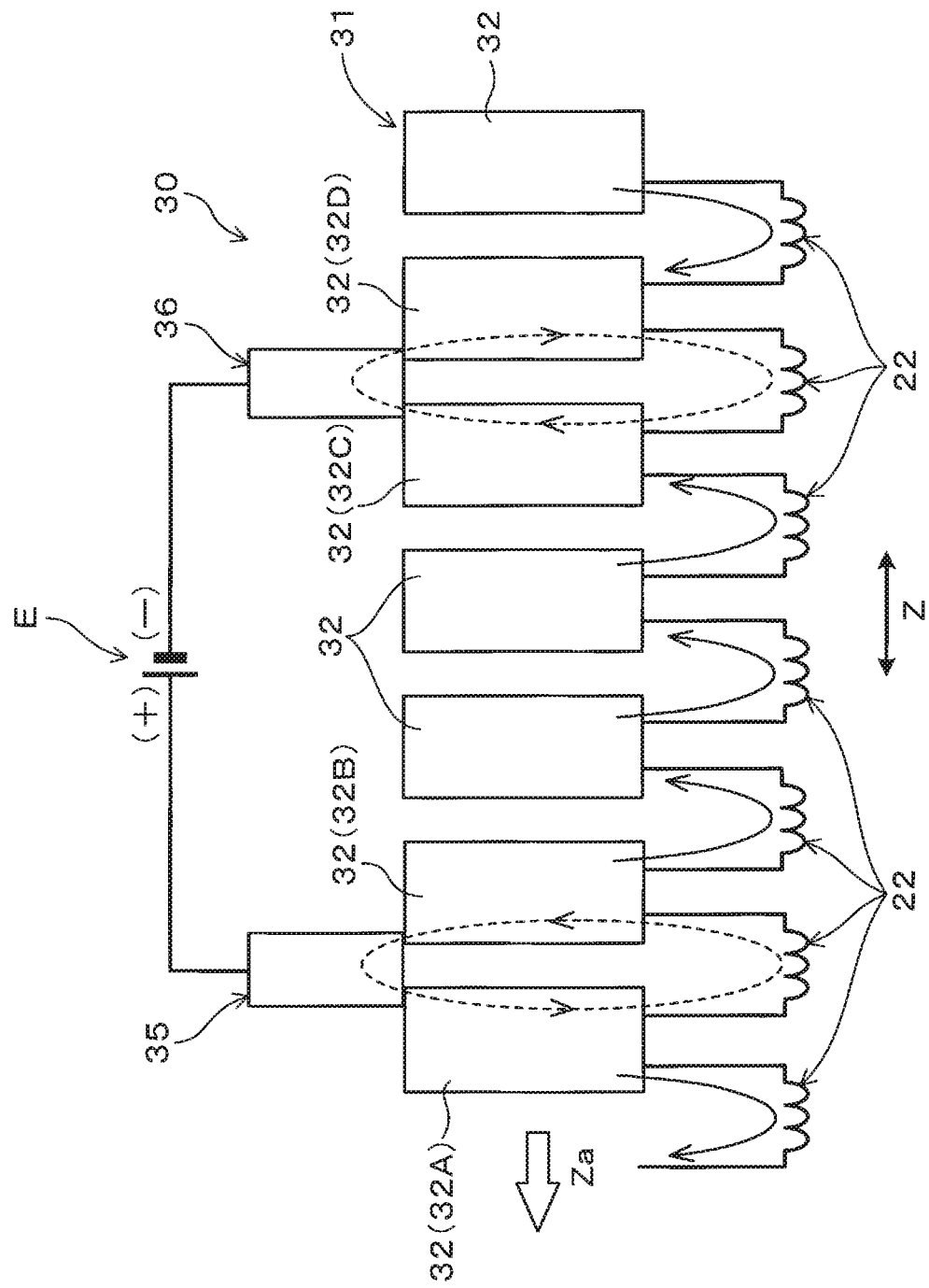
FIG. 3 is a development of commutator segments and brushes which together constitute the electrical contact device according to the first embodiment.

Referring now to FIG. 3, arc discharges occurring in the electrical contact device 30 will be described. In addition, in FIG. 3, for the sake of convenience of explanation, the commutator segments 32 of the commutator 31 are developed on a plane with the left-right direction in FIG. 3 coinciding with the circumferential direction Z.

As shown in FIG. 3, in a state of two adjacent commutator segments 32A and 32B being both in sliding contact with the first brush 35, the electric potential of the two commutator segments 32A and 32B is equal to the electric potential of the positive terminal of the electric power supply E. On the other hand, in a state of two adjacent commutator segments 32C and 32D being both in sliding contact with the second brush 36, the electric potential of the two commutator segments 32C and 32D is equal to the electric potential of the negative terminal of the electric power supply E.

Figure 4:
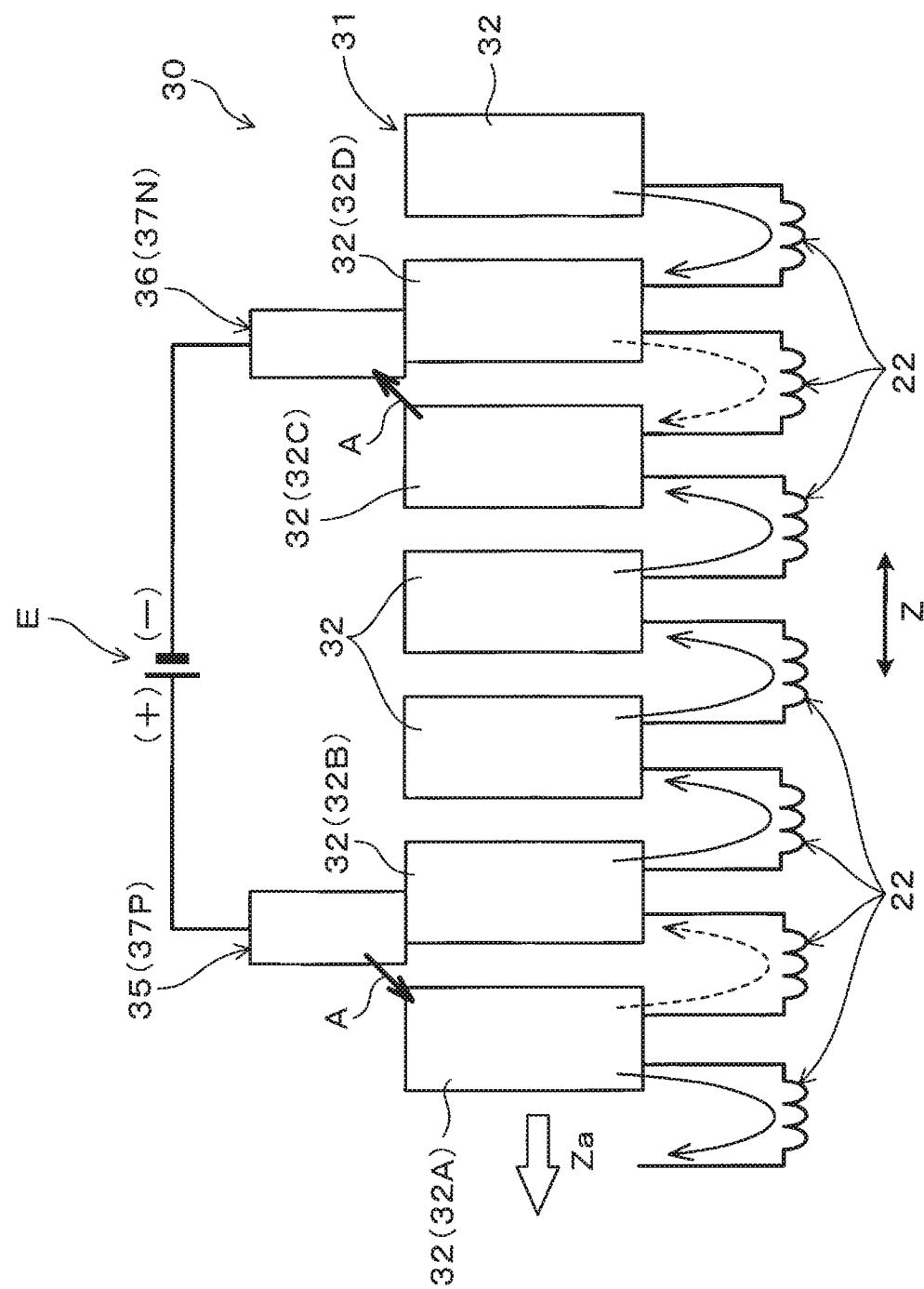
FIG. 4 is an explanatory diagram illustrating arc discharges occurring in the electrical contact device according to the first embodiment.

Further, as shown in FIG. 4, when the commutator segment 32A, which is one of the two commutator segments 32A and 32B in sliding contact with the first brush 35, is brought out of sliding contact with the first brush 35 with rotation of the commutator 31 in the rotational direction Za, an arc A is generated between the commutator segment 32A and the first brush 35. For this arc A, the first brush 35 functions as a positive electrode while the commutator segment 32A functions as a negative electrode. In other words, the first brush 35 constitutes a positive-electrode brush 37P.

On the other hand, when the commutator segment 32C, which is one of the two commutator segments 32C and 32D in sliding contact with the second brush 36, is brought out of sliding contact with the second brush 36 with rotation of the commutator 31 in the rotational direction Za, an arc A is generated between the commutator segment 32C and the second brush 36. For this arc A, the second brush 36 functions as a negative electrode while the commutator segment 32C functions as a positive electrode. In other words, the second brush 36 constitutes a negative-electrode brush 37N.

As described above, in the present embodiment, all of the commutator segments 32 and the first and second brushes 35 and 36 are formed of zinc that has a lower boiling point than copper. Therefore, compared to the case of them being formed of copper, it is possible to increase the vapor density during the arc discharges, thereby suppressing the speed change of electrons. Consequently, it is possible to maintain the arcs A for a longer time, thereby suppressing the rate of change of the arc voltages with time. In particular, by forming all of the commutator segments 32 and the first and second brushes 35 and 36 with zinc whose boiling point is considerably lower than the boiling point of copper, it is possible to effectively increase the density of the zinc vapor during the arc discharges.

Moreover, the inventors of the present application conducted research focusing on the fact that in a high frequency band above 100 MHz, it is particularly easy for burst electromagnetic noise to increase. As a result, the inventors have found that by forming all of the commutator segments 32 and the first and second brushes 35 and 36 with zinc, in a high frequency band above 100 MHz, it is possible to suppress the rate of change of the arc voltages with time over the discharge durations of the arc discharges, thereby effectively reducing burst electromagnetic noise. In addition, for each of the arc discharges, the discharge duration denotes the time period from the start to the end of the arc discharge.

As above, in the electrical contact device 30 according to the present embodiment, it is possible to sufficiently reduce, in a wide frequency band including a high frequency band as well as a low frequency band, electromagnetic noise generated during the arc discharges that occur when the commutator segments 32 and the first and second brushes 35 and 36 make and release sliding contact between them.

Moreover, in the present embodiment, it becomes possible to achieve the reduction of electromagnetic noise without employing any additional electromagnetic noise suppressing element, such as a filter composed of a coil and a capacitor, a metal-made electromagnetic shield, a rotor grounding element or the like. Consequently, it becomes possible to minimize the manufacturing cost of the electrical contact device 30.

In addition, it is preferable that both the positive-electrode brush 37P and the negative-electrode brush 37N contain zinc as described above. However, if necessary, it is also possible to employ a configuration where only the negative-electrode brush 37N contains zinc and the positive-electrode brush 37P is formed of copper without containing zinc. This because the effect of containing zinc on the reduction of burst electromagnetic noise during the arc discharges is higher at the negative-electrode brush 37N than at the positive-electrode brush 37P. In other words, in the case of zinc being contained only in the negative-electrode brush 37N that functions as a negative electrode for each arc A, the effect of containing zinc on the reduction of burst electromagnetic noise during the arc discharges is higher than in the case of zinc being contained only in the positive-electrode brush 37P that functions as a positive electrode for each arc A.

Moreover, in the case of forming the commutator segments 32 and the first and second brushes 35 and 36 with a mixed material that contains zinc, it is preferable that the percentage content of zinc in the mixed material is higher than or equal to 25% by weight. Consequently, it is possible to effectively increase the density of the zinc vapor during the arc discharges.

In addition, provided that a desired effect can be achieved, it is also possible to form the commutator segments 32 and the first and second brushes 35 and 36 with a mixed material whose zinc content is lower than 25% by weight.

Furthermore, it is preferable that zinc is contained in all of the commutator segments 32 and the first and second brushes 35 and 36. However, provided that a desired effect can be achieved, it is possible to employ a configuration where zinc is contained in both the first and second brushes 35 and 36 and at least one of the commutator segments 32, a configuration where zinc is contained in either one of the first and second brushes 35 and 36 and at least one of the commutator segments 32, or a configuration where zinc is contained in only one of the first and second brushes 35 and 36 (i.e., all the commutator segments 32 and one of the first and second brushes 35 and 36 have no zinc contained therein).

In addition, in the present embodiment, the electrical contact device 30 is applied to the rotating electric machine 1 that is configured as an inner rotor motor. However, the electrical contact device 30 can also be applied to an outer rotor motor.

Second Embodiment

An electrical contact device 130 according to the second embodiment has a similar configuration to the electrical contact device 30 according to the first embodiment. Therefore, the differences of the electrical contact device 130 from the electrical contact device 30 will be mainly described hereinafter.

Figure 5:
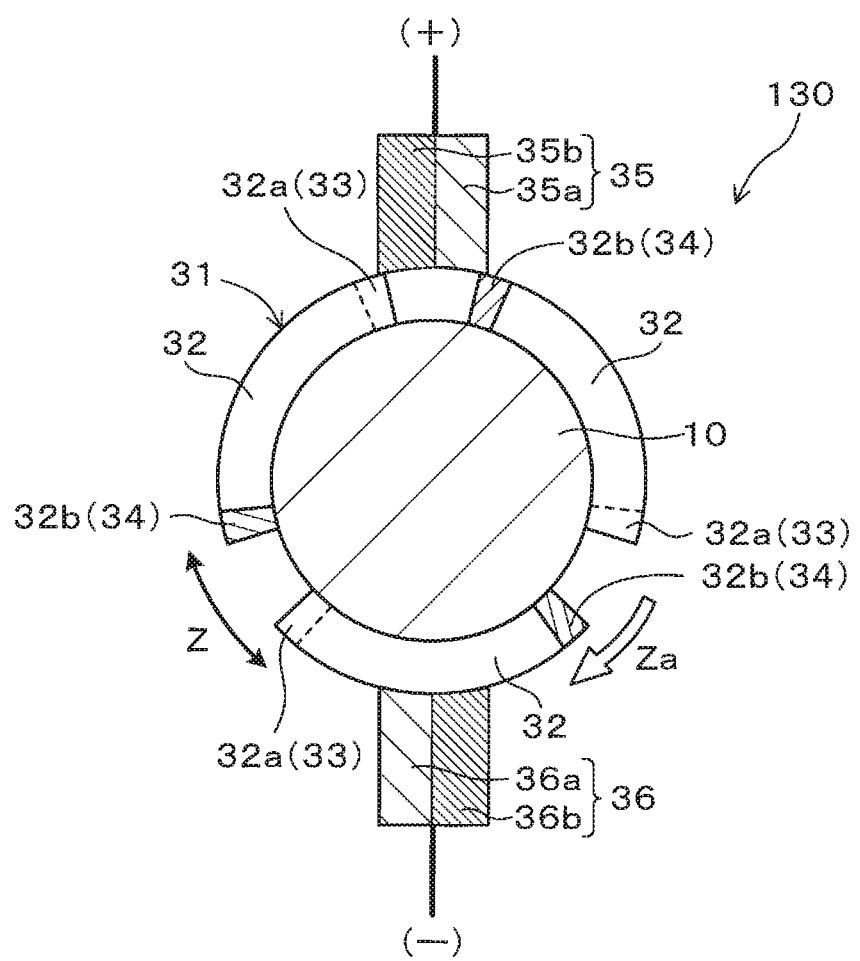
FIG. 5 is a schematic cross sectional view illustrating the configuration of an electrical contact device according to a second embodiment.

As shown in FIG. 5, in the electrical contact device 130 according to the present embodiment, for each of the commutator segments 32, only the rear end portion 32b (i.e., the sliding-contact finishing portion 34) of the commutator segment 32 is formed of zinc that is a low-boiling point material; the remainder of the commutator segment 32 is formed of copper that has a lower electric resistivity than zinc.

Moreover, both the first and second brushes 35 and 36 are formed of a mixed material which is constituted mainly of zinc and carbon. More specifically, in the present embodiment, the first brush 35 is two-part structured to have a first part 35a and a second part 35b arranged in the rotational direction Za of the commutator 31 (or the rotational direction Za of the rotating shaft 10). Zinc is contained only in the first part 35a while carbon is contained only in the second part 35b. Similarly, the second brush 36 is two-part structured to have a first part 36a and a second part 36b arranged in the rotational direction Za of the commutator 31. Zinc is contained only in the first part 36a while carbon is contained only in the second part 36b.

It should be noted that the expression "a mixed material which is constituted mainly of zinc and carbon" denotes that the mixed material may include only trace components and impurities in addition to zinc (i.e., the low-boiling point material) and carbon. Accordingly, if trace components and impurities were removed from the mixed material, the resultant mixed material would be substantially constituted of only zinc and carbon.

Carbon contained in the mixed material functions as a lubricant to lower the sliding resistance between the commutator segments 32 and each of the first and second brushes 35 and 36. Moreover, it is preferable for the first and second parts 35a and 35b of the first brush 35 to be arranged in the rotational direction Za of the commutator 31 so that the second part 35b containing carbon is brought into sliding contact with each of the commutator segments 32 earlier than the first part 35a containing zinc. Similarly, it is preferable for the first and second parts 36a and 36b of the second brush 36 to be arranged in the rotational direction Za of the commutator 31 so that the second part 36b containing carbon is brought into sliding contact with each of the commutator segments 32 earlier than the first part 36a containing zinc.

As above, in the electrical contact device 130 according to the present embodiment, both the first and second brushes 35 and 36 are formed of a mixed material which is constituted mainly of zinc that is a low-boiling point material and carbon that is a lubricant. Consequently, it is possible to effectively increase the density of the zinc vapor during the arc discharges.

Moreover, in the electrical contact device 130 according to the present embodiment, in each of the commutator segments 32, only the sliding-contact finishing portion 34 (i.e., the rear end portion 32b) is formed of zinc. Consequently, it becomes possible to reduce the amount of zinc used in each of the commutator segments 32, thereby lowering the manufacturing cost of the electrical contact device 130. Meanwhile, the remainder of each of the commutator segments 32 is formed of copper that has a lower electric resistivity than zinc. Consequently, it also becomes possible to increase the efficiency of the rotating electric machine 1.

Furthermore, in the electrical contact device 130 according to the present embodiment, the lubricant contained in the first and second brushes 35 and 36 is implemented by carbon that is relatively inexpensive. Consequently, it becomes possible to minimize the manufacturing cost of the electrical contact device 130.

It should be noted that the lubricant contained in the first and second brushes 35 and 36 is not limited to carbon, but may be implemented by other lubricants than carbon as necessary. It also should be noted that in each of the commutator segments 32, the other portions than the sliding-contact finishing portion 34 (i.e., the rear end portion 32b) may alternatively be formed of materials different from copper and having a lower electric resistivity than zinc.

In addition, according to the present embodiment, it is also possible to achieve the same advantageous effects as achievable according to the first embodiment.

As a modification to the electrical contact device 130 according to the present embodiment, it is possible to employ a configuration where only the sliding-contact starting portion 33 (i.e., the front end portion 32a) of each of the commutator segments 32 is formed of zinc or a configuration where both the sliding-contact starting and sliding-contact finishing portions 33 and 34 of each of the commutator segments 32 is formed of zinc.

Third Embodiment

An electrical contact device 230 according to the third embodiment has a similar configuration to the electrical contact device 130 according to the second embodiment. Therefore, the differences of the electrical contact device 230 from the electrical contact device 130 will be mainly described hereinafter.

Figure 6:
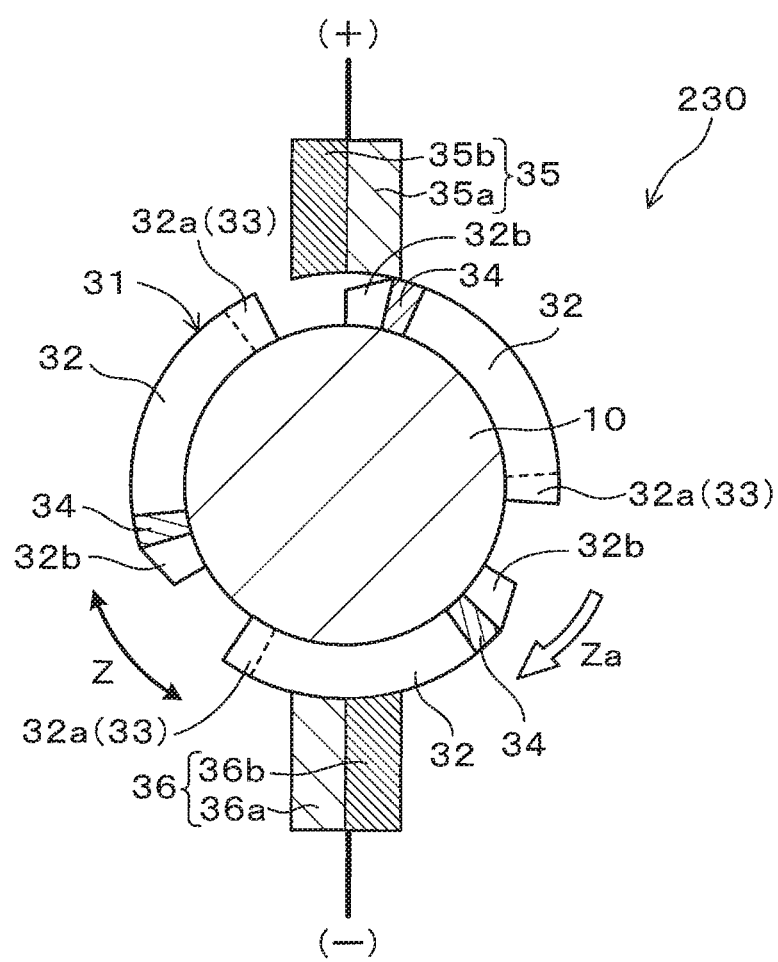
FIG. 6 is a schematic cross sectional view illustrating the configuration of an electrical contact device according to a third embodiment.

As shown in FIG. 6, in the electrical contact device 230 according to the present embodiment, each of the commutator segments 32 is formed so that the radial height of the rear end portion 32b of the commutator segment 32 gradually decreases in the circumferential direction Z toward a rear end surface of the commutator segment 32. Consequently, in each of the commutator segments 32, the sliding-contact finishing portion 34 is located forward of the rear end portion 32b in the rotational direction Za (i.e., located closer than the rear end portion 32b to the front end portion 32a).

According to the present embodiment, it is also possible to achieve the same advantageous effects as achievable according to the second embodiment.

As a modification to the electrical contact device 230 according to the present embodiment, it is possible to employ a configuration where only the sliding-contact starting portion 33 (i.e., the front end portion 32a) of each of the commutator segments 32 is formed of zinc or a configuration where both the sliding-contact starting and sliding-contact finishing portions 33 and 34 of each of the commutator segments 32 is formed of zinc.

Fourth Embodiment

An electrical contact device 330 according to the fourth embodiment has a similar configuration to the electrical contact device 130 according to the second embodiment. Therefore, the differences of the electrical contact device 330 from the electrical contact device 130 will be mainly described hereinafter.

Figure 7:
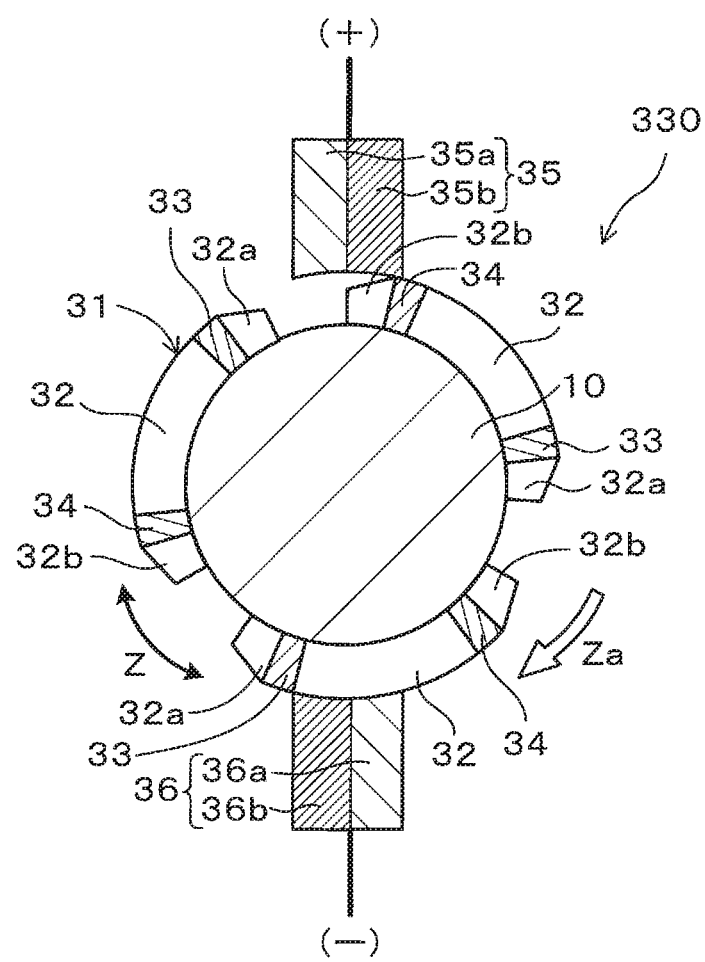
FIG. 7 is a schematic cross sectional view illustrating the configuration of an electrical contact device according to a fourth embodiment.

As shown in FIG. 7, in the electrical contact device 330 according to the present embodiment, each of the commutator segments 32 is formed so that: the radial height of the front end portion 32a of the commutator segment 32 gradually decreases in the circumferential direction Z toward a front end surface of the commutator segment 32; and the radial height of the rear end portion 32b of the commutator segment 32 gradually decreases in the circumferential direction Z toward a rear end surface of the commutator segment 32. Consequently, in each of the commutator segments 32, the sliding-contact starting portion 33 is located backward of the front end portion 32a in the rotational direction Za (i.e., located closer than the front end portion 32a to the rear end portion 32b), the sliding-contact finishing portion 34 is located forward of the rear end portion 32b in the rotational direction Za (i.e., located closer than the rear end portion 32b to the front end portion 32a).

According to the present embodiment, it is also possible to achieve the same advantageous effects as achievable according to the second embodiment.

Fifth Embodiment

An electrical contact device 430 according to the fifth embodiment has a similar configuration to the electrical contact device 30 according to the first embodiment. Therefore, the differences of the electrical contact device 430 from the electrical contact device 30 will be mainly described hereinafter.

Figure 8:
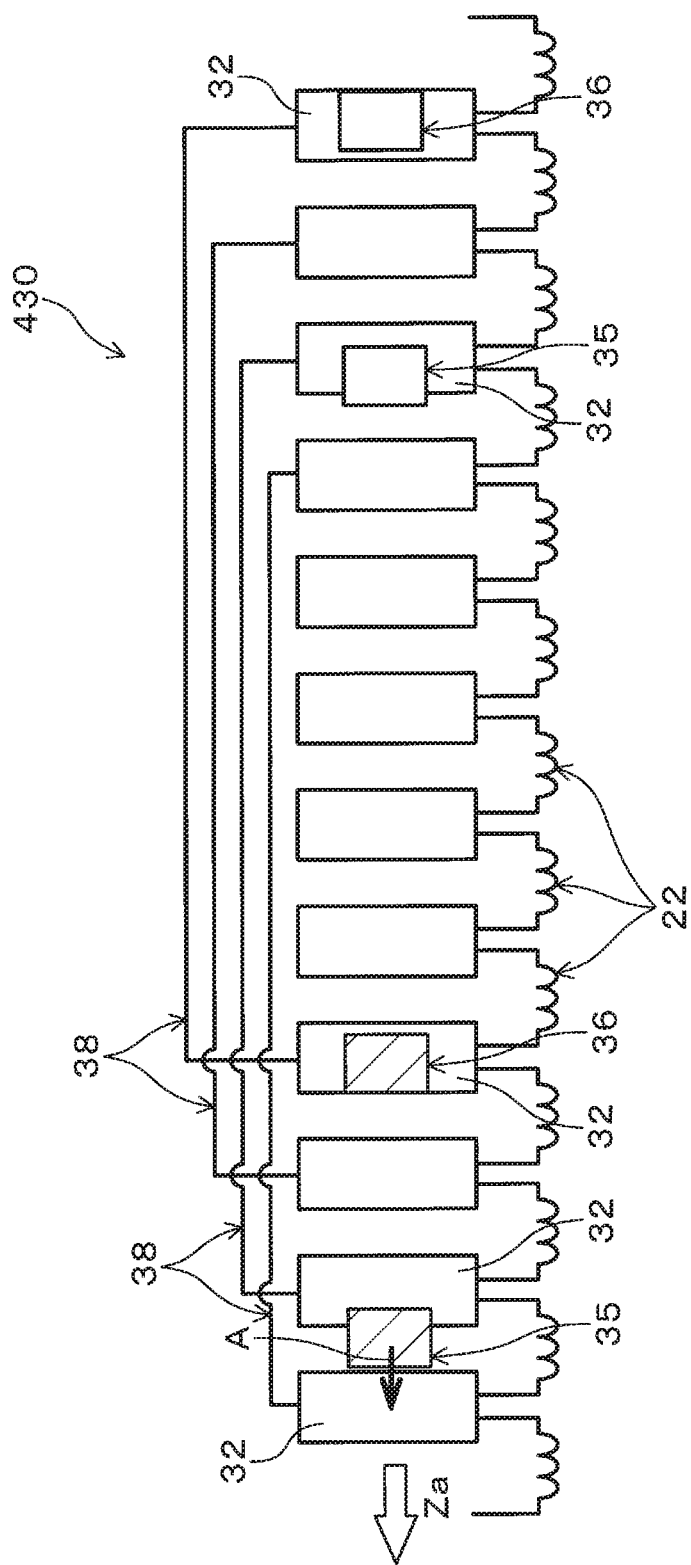
FIG. 8 is a development of commutator segments and brushes which together constitute an electrical contact device according to a fifth embodiment.

As shown in FIG. 8, the electrical contact device 430 according to the present embodiment further includes a plurality of voltage-equalizing lines 38 each of which electrically connects one corresponding pair of the commutator segments 32. Consequently, it is possible to finely switch the voltage to reduce the pulsation, thereby suppressing the torque fluctuation.

Moreover, the electrical contact device 430 according to the present embodiment includes a pair of first brushes 35 and a pair of second brushes 36. Further, of all the four brushes 35 and 36, the two brushes 35 and 36 each of which is brought out of sliding contact with one of the commutator segments 32 immediately before the generation of an arc A therebetween are formed zinc that is a low-boiling point material. With this configuration, it is possible to increase the vapor density during the arc discharges, thereby suppressing the speed change of electrons. Consequently, it is possible to effectively reduce burst electromagnetic noise.

According to the present embodiment, it is also possible to achieve the same advantageous effects as achievable according to the first embodiment.

Sixth Embodiment

Figure 9:
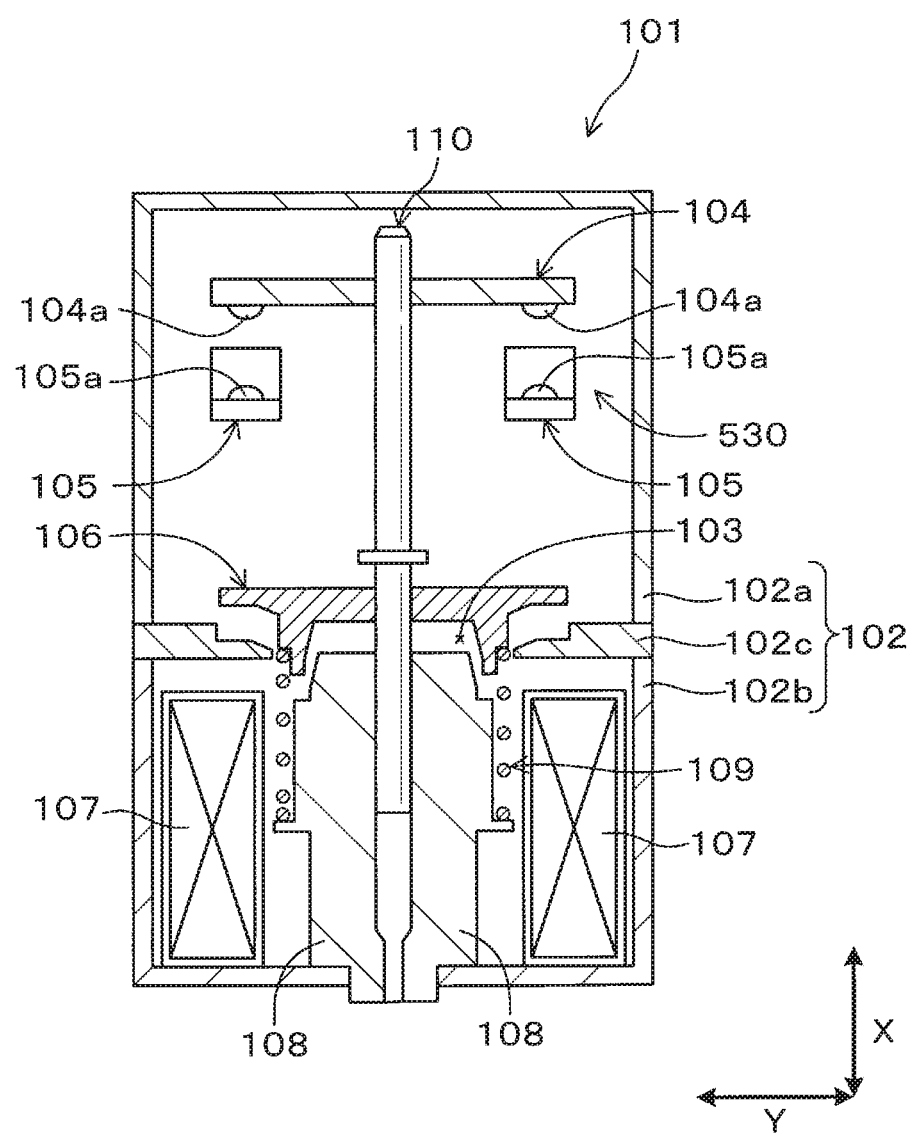
FIG. 9 is a schematic cross-sectional view, along an axial direction of a shaft, of an electromagnetic relay which includes an electrical contact device according to a sixth embodiment.

FIG. 9 shows the overall configuration of an electromagnetic relay 101 which includes an electrical contact device 530 according to the sixth embodiment.

In the present embodiment, unless specified otherwise, an axial direction of a shaft 110 of the electromagnetic relay 101 is indicted by an arrow X; and a radial direction of the shaft 110 is indicated by an arrow Y.

As shown in FIG. 9, the electromagnetic relay 101 includes a case 102 that is composed of a first case 102a, a second case 102b and a third case 102c mounted between the first and second cases 102a and 102b. In the third case 102c, there is formed a through-hole 103 through which the shaft 110 and a movable core 106 are movable in the axial direction X.

In a space enclosed by the first case 102a and the third case 102c, there are received a mover 104 having two movable contacts 104a, two fixed terminals 105 each having one fixed contact 105a, and the movable core 106 formed of a magnetic metal material.

One of the movable contacts 104a of the mover 104 is arranged to face one of the fixed contacts 105a of the fixed terminals 105 in the axial direction X. Moreover, the other of the movable contacts 104a of the mover 104 is arranged to face the other of the fixed contacts 105a of the fixed terminals 105 in the axial direction X.

In the present embodiment, the electrical contact device 530 is configured with the two movable contacts 104a each constituting a high electric potential-side contact and the two fixed contacts 105a each constituting a low electric potential-side contact. Each of the movable contacts 104a is configured to be brought into and out of contact with a corresponding one of the fixed contacts 105a.

In a space enclosed by the second case 102b and the third case 102c, there are received an excitation coil 107, a fixed core 108 and a restoring spring 109. The excitation coil 107 creates a magnetic field upon being energized. The fixed core 108 is formed of a magnetic metal material and arranged inside the excitation coil 107 in the radial direction Y. The restoring spring 109 is mounted between the movable core 106 and the fixed core 108.

The restoring spring 109 is configured to always elastically urge the movable core 106 in the axial direction X away from the fixed core 108.

On the shaft 110, there are fixed both the mover 104 and the movable core 106. An end portion of the shaft 110, which is on the opposite side of the movable core 106 to the mover 104, extends inside the movable core 108 to the vicinity of the excitation coil 107.

When the excitation coil 107 is not energized, the mover 104 is located, under the elastic urging force of the restoring spring 109, at a position away from the fixed terminals 105 in the axial direction X. Consequently, the movable contacts 104a are out of contact with the corresponding fixed contacts 105a. As a result, no electric current is allowed to flow across the movable contacts 104a and the corresponding fixed contacts 105a.

On the other hand, upon the excitation coil 107 being energized, the movable core 106 is attracted by an electromagnetic attracting force toward the fixed core 108 against the elastic urging force of the restoring spring 109. Consequently, with the movement of the movable core 106 toward the fixed core 108, the mover 104 moves toward the fixed terminals 105 (i.e., downward in FIG. 9), bringing the movable contacts 104a into contact with the corresponding fixed contacts 105a. As a result, electric current is allowed to flow across the movable contacts 104a and the corresponding fixed contacts 105a.

Figure 10:
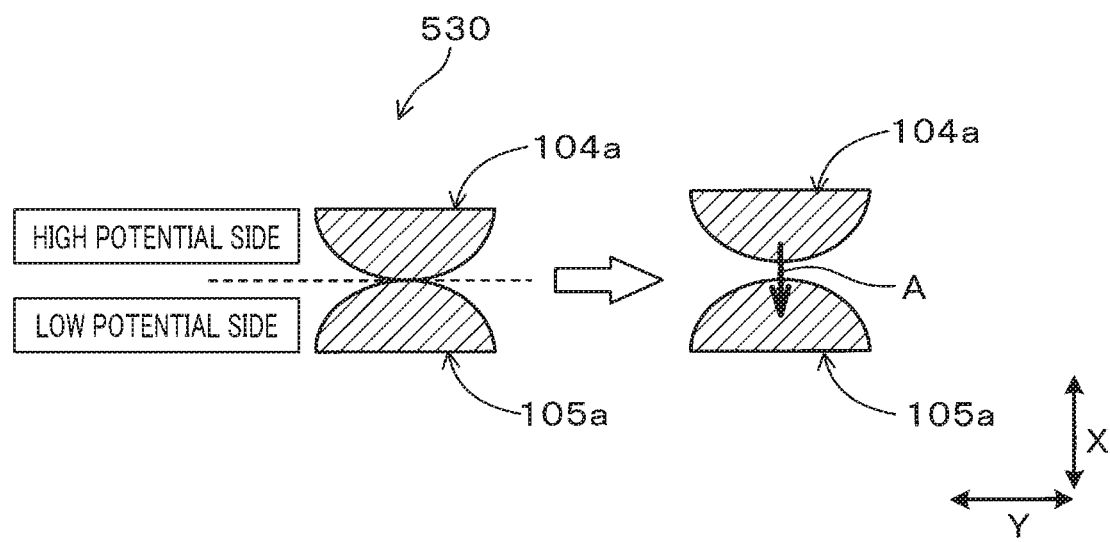
FIG. 10 is a schematic cross sectional view illustrating the configuration of the electrical contact device according to the sixth embodiment.

As shown in FIG. 10, in the electrical contact device 530 according to the present embodiment, all of the two movable contacts 104a and the two fixed contacts 105a are formed of zinc that is a low-boiling point material. That is, the high electric potential-side contacts (i.e., the movable contacts 104a) and the low electric potential-side contacts (i.e., the fixed contacts 105a) are all formed of a low-boiling point material whose boiling point is lower than 2562° C. In addition, it should be noted that for the sake of simplicity, only one pair of the movable contacts 104a and the fixed contacts 105a is shown in FIG. 10.

In the electrical contact device 530 according to the present embodiment, arcs A are generated during arc discharges that occur when the movable contacts 104a are brought into and out of contact with the corresponding fixed contacts 105a. However, as described above, all of the movable contacts 104a and the fixed contacts 105a are formed of zinc. Therefore, compared to the case of them being formed of copper, it is possible to suppress the rate of change of the arc voltages with time over the discharge durations of the arc discharges, thereby effectively reducing burst electromagnetic noise.

Seventh Embodiment

An electrical contact device 630 according to the seventh embodiment has a similar configuration to the electrical contact device 530 according to the sixth embodiment. Therefore, the differences of the electrical contact device 630 from the electrical contact device 530 will be mainly described hereinafter.

Figure 11:
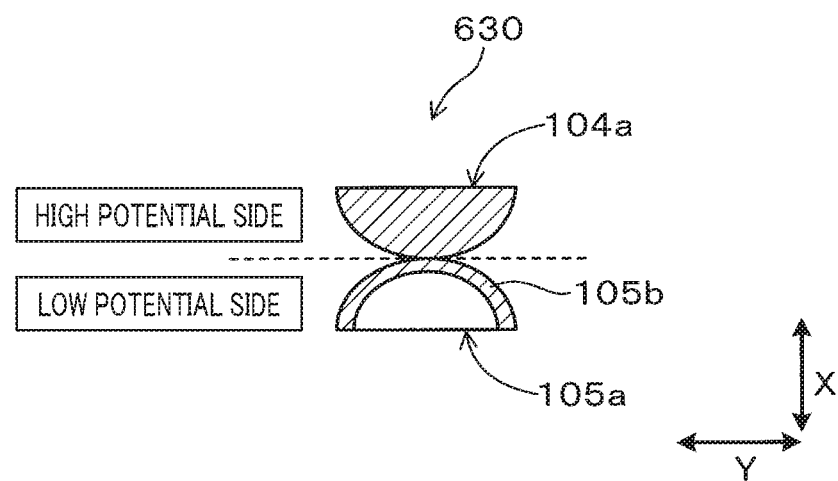
FIG. 11 is a schematic cross sectional view illustrating the configuration of an electrical contact device according to a seventh embodiment.

As shown in FIG. 11, in the electrical contact device 630 according to the present embodiment, each of the fixed contacts 105a has, on its surface, a coating layer 105b formed of zinc. The remainder of each of the fixed contacts 105a is formed of copper.

With the above configuration, it is possible to reduce the amount of zinc used in each of the fixed contacts 105a, thereby lowering the manufacturing cost of the electrical contact device 630.

In addition, according to the present embodiment, it is also possible to achieve the same advantageous effects as achievable according to the sixth embodiment.

Eighth Embodiment

An electrical contact device 730 according to the eighth embodiment has a similar configuration to the electrical contact device 530 according to the sixth embodiment. Therefore, the differences of the electrical contact device 730 from the electrical contact device 530 will be mainly described hereinafter.

Figure 12:
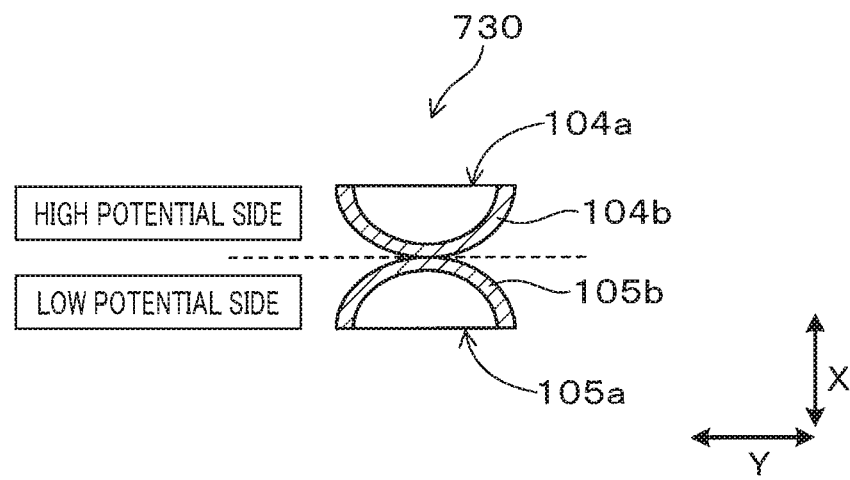
FIG. 12 is a schematic cross sectional view illustrating the configuration of an electrical contact device according to an eighth embodiment.

As shown in FIG. 12, in the electrical contact device 730 according to the present embodiment, each of the movable contacts 104a has, on its surface, a coating layer 104b formed of zinc. The remainder of each of the movable contacts 104a is formed of copper. Similarly, each of the fixed contacts 105a has, on its surface, a coating layer 105b formed of zinc. The remainder of each of the fixed contacts 105a is formed of copper.

With the above configuration, it is possible to reduce the amount of zinc used in each of the movable contacts 104a and the fixed contacts 105a, thereby lowering the manufacturing cost of the electrical contact device 730.

In addition, according to the present embodiment, it is also possible to achieve the same advantageous effects as achievable according to the sixth embodiment.

Ninth Embodiment

An electrical contact device 830 according to the ninth embodiment has a similar configuration to the electrical contact device 730 according to the eighth embodiment. Therefore, the differences of the electrical contact device 830 from the electrical contact device 730 will be mainly described hereinafter.

Figure 13:
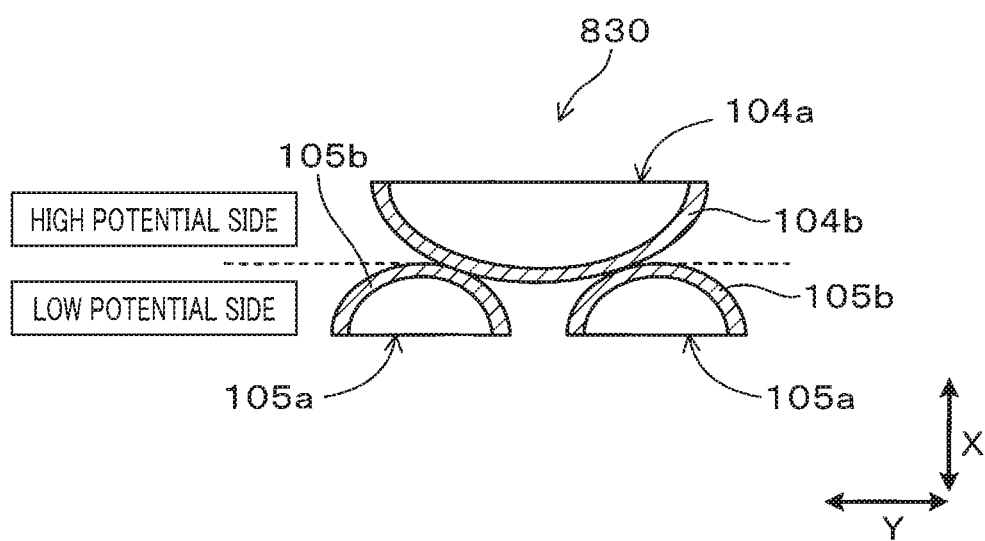
FIG. 13 is a schematic cross sectional view illustrating the configuration of an electrical contact device according to a ninth embodiment.

As shown in FIG. 13, the electrical contact device 830 according to the present embodiment includes only one movable contact 104*a* that is configured to be brought into and out of contact with both the fixed contacts 105*a*.

With the above configuration, the number of the movable contacts 104*a* is reduced, thereby lowering the manufacturing cost of the electrical contact device 830.

In addition, according to the present embodiment, it is also possible to achieve the same advantageous effects as achievable according to the eighth embodiment.

As described above, in the electrical contact device 30 according to the first embodiment, all of the commutator segments 32 and the first and second brushes 35 and 36 are formed of zinc that is a low-boiling point material; consequently, it is possible to increase the density of the zinc vapor during the arc discharges, thereby reducing electromagnetic noise. However, when the rotating electric machine 1 operates under a high-current condition, it may be difficult to effectively reduce electromagnetic noise. Therefore, a technique is demanded with which it is possible to effectively reduce electromagnetic noise under a high-current condition.

The inventors of the present application investigated the cause of the difficulty in effectively reducing electromagnetic noise under a high-current condition. As a result, the inventors have found that when an oxide of the low-boiling point material (e.g., zinc oxide in the case of the low-boiling point material being zinc) has been produced, under a high-current condition, by oxidation of the molten low-boiling point material and adhered to the surfaces of the commutator segments 32 (i.e., the sliding surfaces), it becomes difficult to effectively reduce electromagnetic noise.

Hereinafter, the tenth to the fourteenth embodiments will be described which are based on the above finding of the inventors.

Tenth Embodiment

Figure 14:
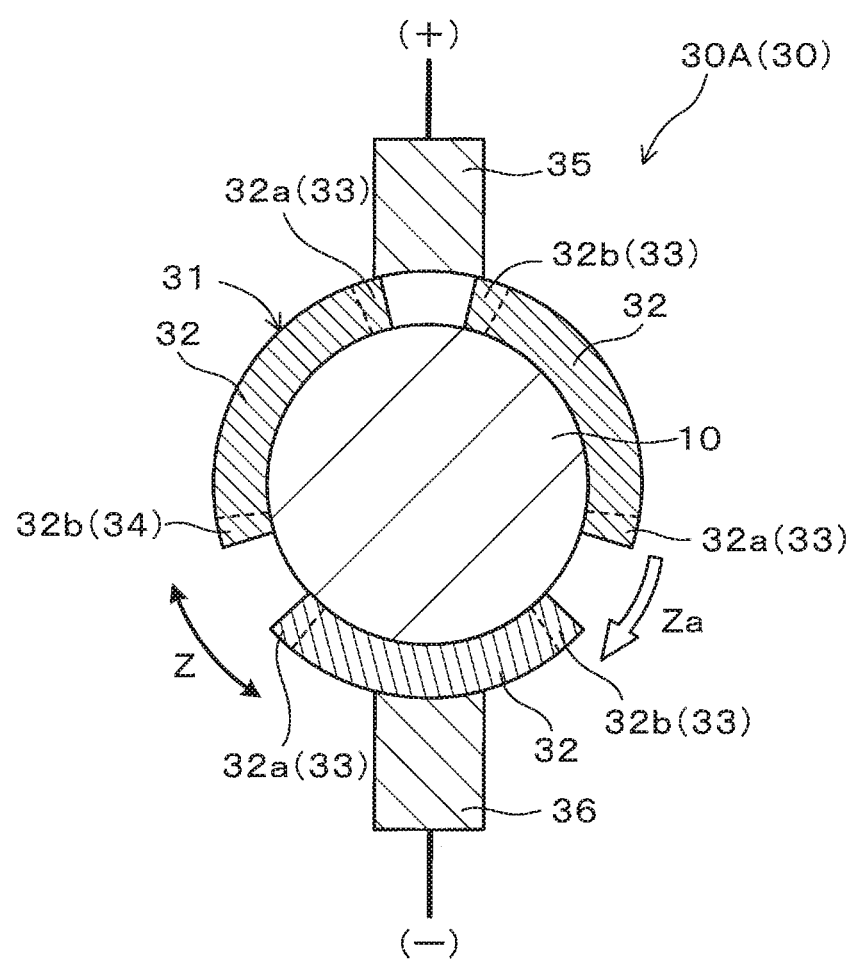
FIG. 14 is a schematic cross sectional view illustrating the configuration of an electrical contact device according to a tenth embodiment.

As shown in FIG. 14, an electrical contact device 30A according to the tenth embodiment is applied, as a modification of the electrical contact device 30 according to the first embodiment, to the rotating electric machine 1 shown in FIG. 1.

In the electrical contact device 30A, the first and second brushes 35 and 36 are provided with a function of physically removing adhering objects from the surfaces of the commutator segments 32, thereby making it possible to effectively reduce electromagnetic noise under a high-current condition.

Specifically, in the electrical contact device 30A, both the first and second brushes 35 and 36 contain an abrasive as well as zinc. That is, the electrical contact device 30A has a sliding-contact structure (to be referred to as "first sliding-contact structure" hereinafter) such that the first and second brushes 35 and 36 make sliding contact with each of the commutator segments 32 via the abrasive.

It is preferable to employ, as the abrasive, a material which has a higher hardness than adhering objects on the surfaces of the commutator segments 32. Specifically, in the present embodiment, adhering objects on the surfaces of the commutator segments 32 include zinc oxide. The abrasive contained in the first and second brushes 35 and 36 may be implemented by a material having a higher hardness than zinc oxide, such as silicon carbide, meso-carbon powder or a copper-manganese alloy. The abrading performance of silicon carbide is relatively high; therefore, in terms of effectively suppressing adherence of zinc oxide to the surfaces of the commutator segments 32, it is preferable to employ silicon carbide as the abrasive. In contrast, in terms of extending the service life of the electrical contact device 30A, it is preferable to employ meso-carbon powder or a copper-manganese alloy as the abrasive.

It is preferable that the percentage content of the abrasive in each of the first and second brushes 35 and 36 is lower than or equal to 10% by weight. In addition, if the percentage content of the abrasive is higher than 10% by weight, the percentage content of zinc in each of the first and second brushes 35 and 36 is accordingly lowered; consequently, it may become difficult to effectively reduce electromagnetic noise.

Moreover, in the case of the percentage content of the abrasive being high (e.g., being higher than 10% by weight), the frictional heat generated due to the abrading by the abrasive is accordingly increased. Consequently, the amount of molten zinc and thus the amount of produced zinc oxide is accordingly increased, causing damage to the commutator segments 32. Therefore, it is preferable to set the percentage content of the abrasive to be low taking into account the frictional heat generated due to the abrading by the abrasive.

In the electrical contact device 30A according to the present embodiment, with sliding movement of each of the commutator segments 32 in the circumferential direction Z with respect to the first and second brushes 35 and 36 during rotation of the commutator 31, the abrasive contained in the first and second brushes 35 and 36 abrades the surfaces of the commutator segments 32 to physically scrape off zinc oxide having adhered to the surfaces of the commutator segments 32. Consequently, the amount of zinc oxide on the surfaces of the commutator segments 32 is reduced. As a result, even when the rotating electric machine 1 operates under a high-current condition, it is still possible to increase the density of the zinc vapor during the arc discharges, thereby effectively reducing electromagnetic noise.

In addition, according to the present embodiment, it is also possible to achieve the same advantageous effects as achievable according to the first embodiment.

As a modification to the electrical contact device 30A according to the present embodiment, it is possible to employ a configuration where only one of the first and second brushes 35 and 36 contains the abrasive.

Eleventh Embodiment

An electrical contact device 30B according to the eleventh embodiment has a similar configuration to the electrical contact device 30A according to the tenth embodiment. Therefore, the differences of the electrical contact device 30B from the electrical contact device 30A will be mainly described hereinafter.

Figure 15:
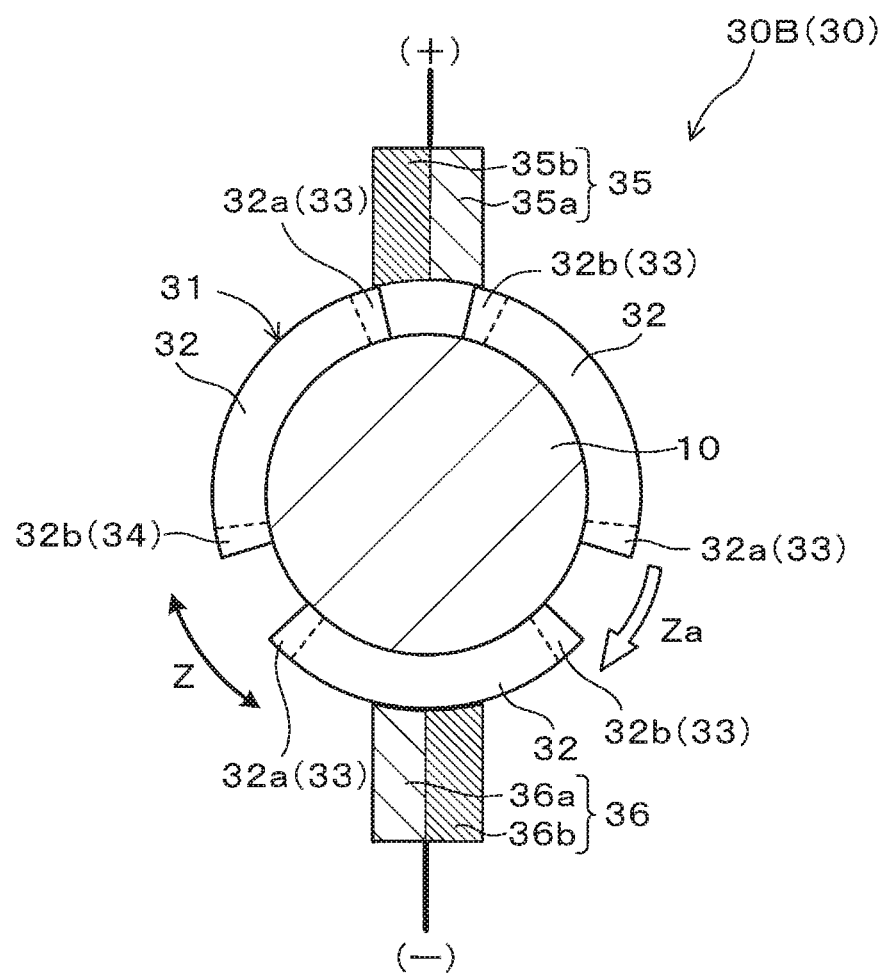
FIG. 15 is a schematic cross sectional view illustrating the configuration of an electrical contact device according to an eleventh embodiment.

As shown in FIG. 15, in the electrical contact device 30B according to the present embodiment, each of the commutator segments 32 is formed of copper.

Moreover, the first brush 35 is two-part structured to have a first part 35*a* and a second part 35*b* arranged in the rotational direction Za of the commutator 31 (or the rotational direction Za of the rotating shaft 10). The first part 35*a* contains zinc while the second part 35*b* contains copper and/or carbon, but no zinc. Further, of the first and second parts 35*a* and 35*b*, only the first part 35*a* contains an abrasive.

Similarly, the second brush 36 is two-part structured to have a first part 36*a* and a second part 36*b* arranged in the rotational direction Za of the commutator 31. The first part 36*a* contains zinc while the second part 36*b* contains copper and/or carbon, but no zinc. Further, of the first and second parts 36a and 36b, only the first part 36a contains an abrasive.

According to the present embodiment, it is also possible to achieve the same advantageous effects as achievable according to the tenth embodiment.

In particular, in the electrical contact device 30B according to the present embodiment, with sliding movement of each of the commutator segments 32 with respect to the brushes 35 and 36, the abrasive contained in the first parts 35a and 36a of the brushes 35 and 36 abrades the surfaces of the commutator segments 32 to physically scrape off zinc oxide having adhered to the surfaces of the commutator segments 32.

As a modification to the electrical contact device 30B according to the present embodiment, it is possible to employ a configuration where only one of the first parts 35a and 36a of the brushes 35 and 36 contains the abrasive.

Twelfth Embodiment

An electrical contact device 30C according to the twelfth embodiment has a similar configuration to the electrical contact device 30B according to the eleventh embodiment. Therefore, the differences of the electrical contact device 30C from the electrical contact device 30B will be mainly described hereinafter.

Figure 16:
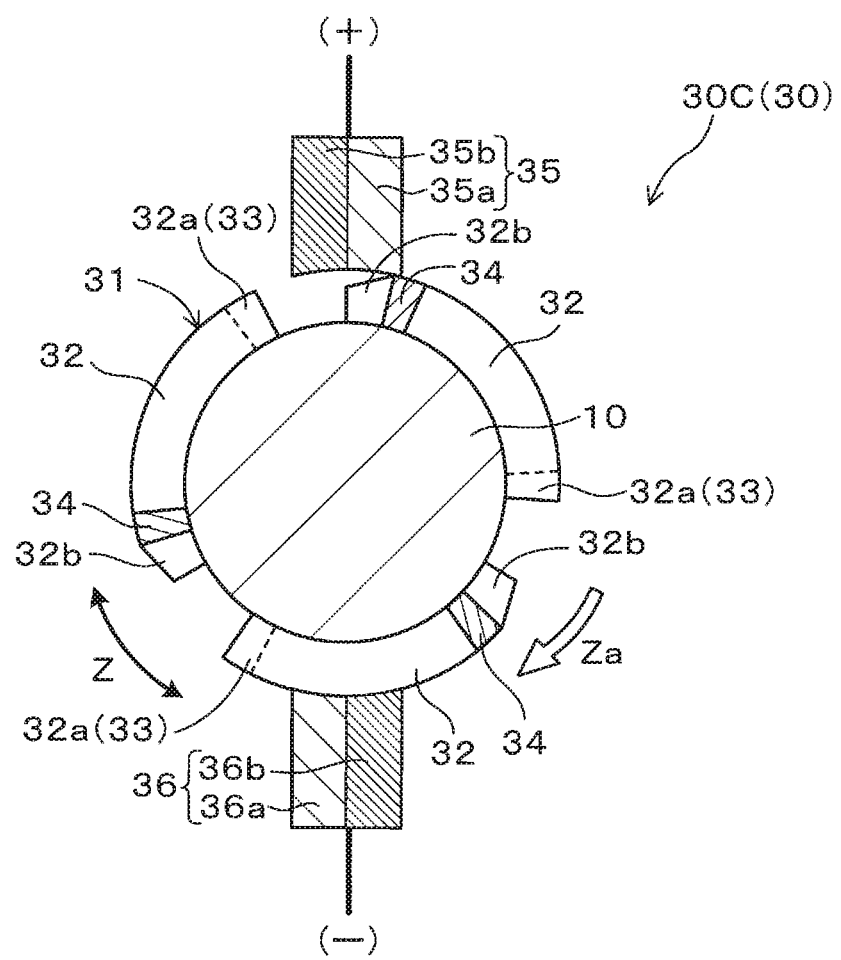
FIG. 16 is a schematic cross sectional view illustrating the configuration of an electrical contact device according to a twelfth embodiment.

As shown in FIG. 16, in the electrical contact device 30C according to the present embodiment, each of the commutator segments 32 is formed so that the radial height of the rear end portion 32b of the commutator segment 32 gradually decreases in the circumferential direction Z toward a rear end surface of the commutator segment 32. Consequently, in each of the commutator segments 32, the sliding-contact finishing portion 34 is located forward of the rear end portion 32b in the rotational direction Za (i.e., located closer than the rear end portion 32b to the front end portion 32a).

Moreover, in the electrical contact device 30C according to the present embodiment, in each of the commutator segments 32, only the sliding-contact finishing portion 34 is formed of zinc. Meanwhile, the remainder of each of the commutator segments 32 is formed of copper.

According to the present embodiment, it is also possible to achieve the same advantageous effects as achievable according to the eleventh embodiment.

In particular, in the electrical contact device 30C according to the present embodiment, with sliding movement of each of the commutator segments 32 with respect to the brushes 35 and 36, the abrasive contained in the first parts 35a and 36a of the brushes 35 and 36 abrades the surfaces of the commutator segments 32 to physically scrape off zinc oxide having adhered to the surfaces of the commutator segments 32.

As a modification to the electrical contact device 30C according to the present embodiment, it is possible to employ a configuration where only one of the first parts 35a and 36a of the brushes 35 and 36 contains the abrasive.

Thirteenth Embodiment

An electrical contact device 30D according to the thirteenth embodiment is applied, as a modification of the electrical contact device 30 according to the first embodiment, to the rotating electric machine 1 shown in FIG. 1.

Figure 17:
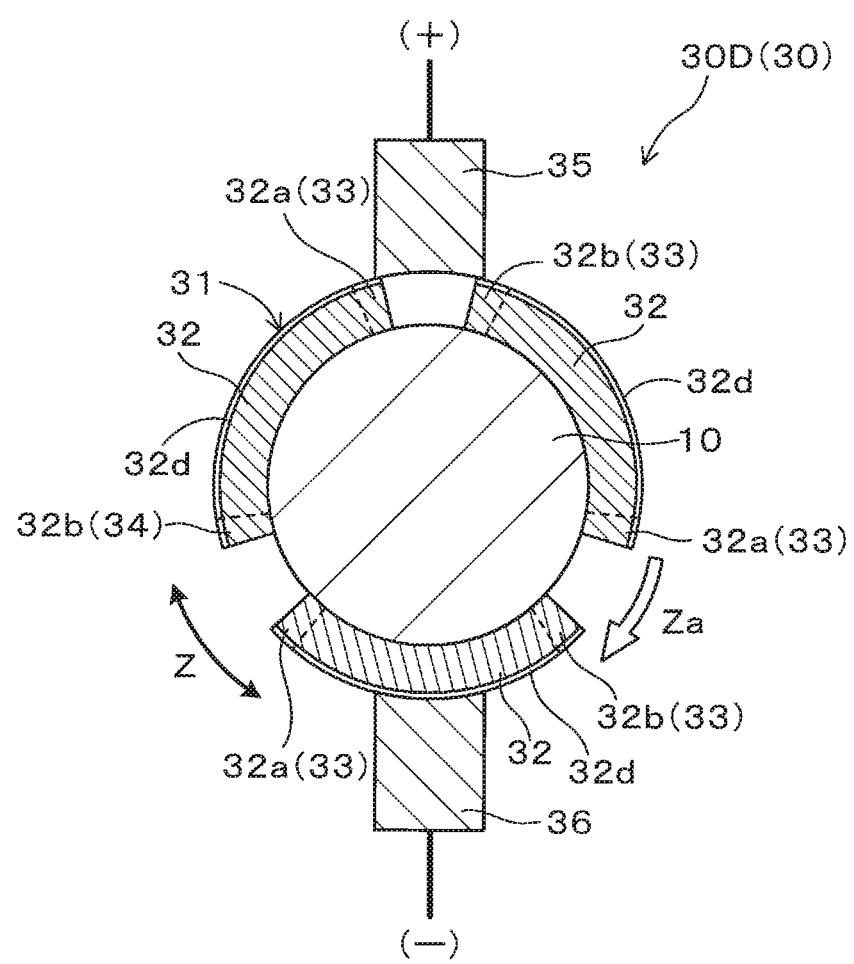
FIG. 17 is a schematic cross sectional view illustrating the configuration of an electrical contact device according to a thirteenth embodiment.

As shown in FIG. 17, in the electrical contact device 30D according to the present embodiment, each of the commutator segments 32 has a plated layer 32d formed on a sliding surface thereof, thereby making it difficult for adhering objects to adhere to the sliding surface. Consequently, even when the rotating electric machine 1 operates under a high-current condition, it is still possible to effectively reduce electromagnetic noise.

Specifically, in the present embodiment, a plating process is performed, using at least one material selected from silver, nickel and palladium, on the sliding surface of each of the commutator segments 32. Consequently, the electrical contact device 30D has a sliding-contact structure (to be referred to as "second sliding-contact structure" hereinafter) where on the sliding surface of each of the commutator segments 32, there is formed the plated layer 32d of at least one material selected from silver, nickel and palladium.

In the electrical contact device 30D according to the present embodiment, with the plated layer 32d, the corrosion resistance (or oxidation resistance) of each of the commutator segments 32 is improved, thereby preventing zinc oxide from being produced on the sliding surfaces of the commutator segments 32. Consequently, even when the rotating electric machine 1 operates under a high-current condition, it is still possible to effectively reduce electromagnetic noise.

In addition, according to the present embodiment, it is also possible to achieve the same advantageous effects as achievable according to the first embodiment.

Fourteenth Embodiment

An electrical contact device 30E according to the fourteenth embodiment is applied, as a modification of the electrical contact device 30 according to the first embodiment, to the rotating electric machine 1 shown in FIG. 1.

Figure 18:
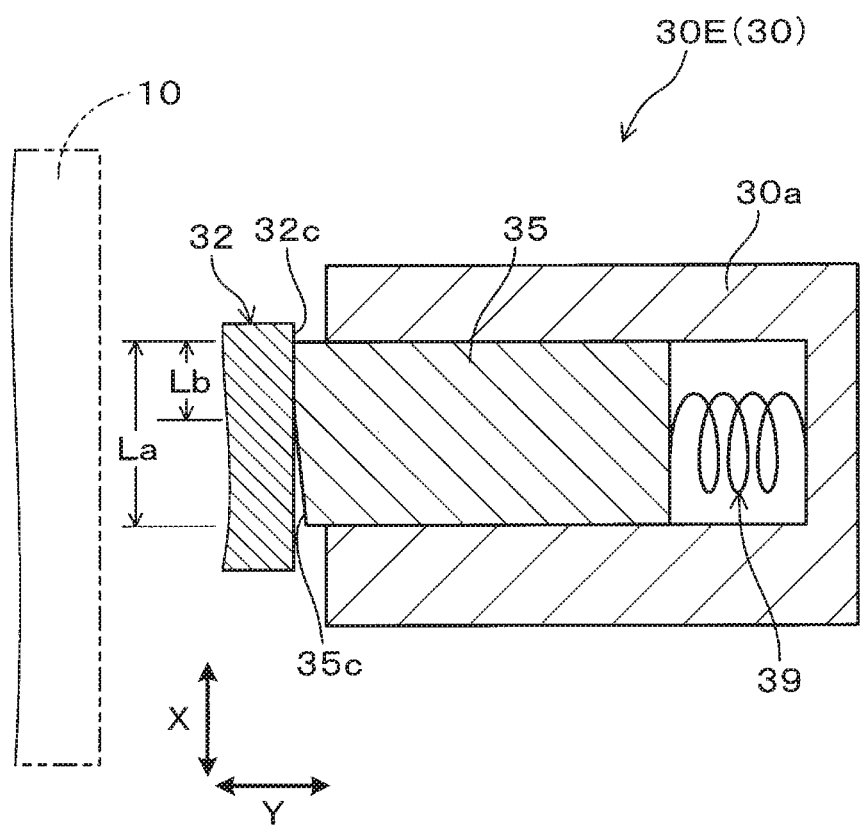
FIG. 18 is a schematic cross sectional view illustrating the configuration of an electrical contact device according to a fourteenth embodiment.

As shown in FIG. 18, in the electrical contact device 30E according to the present embodiment, the amount of molten resin is reduced, thereby making it difficult for adhering objects to adhere to the sliding surfaces of the commutator segments 32. Consequently, even when the rotating electric machine 1 operates under a high-current condition, it is still possible to effectively reduce electromagnetic noise.

Specifically, in the electrical contact device 30E according to the present embodiment, the sliding areas of the first and second brushes 35 and 36 with respect to the commutator segments 32 are increased, thereby lowering the electric resistance to electric current that flows via the sliding contact between the brushes 35 and 36 and the commutator segments 32. More specifically, the electrical contact device 30E has a sliding-contact structure (to be referred to as "third sliding-contact structure" hereinafter) where each of the first and second brushes 35 and 36 makes sliding contact with the commutator segments 32 for a sliding length Lb that is greater than or equal to 1/10 of an opposing length La of each of the brushes 35 and 36 in the axial direction X.

It should be noted that the third sliding-contact structure is identically applied to the first and second brushes 35 and 36. Therefore, the third sliding-contact structure will be described hereinafter with respect to only the first brush 35.

In the third sliding-contact structure, the opposing length La is a length in the axial direction X for which an opposing surface 35c of the brush 35 slidably opposes each of the commutator segments 32. In contrast, the sliding length Lb is a length in the axial direction X for which the opposing surface 35c of the brush 35 actually makes sliding contact with an opposing surface 32c of each of the commutator segments 32. When the opposing surface 35c of the brush 35 is substantially parallel to the opposing surface 32c of each of the commutator segments 32, the sliding length Lb is substantially equal to the opposing length La. Moreover, the sliding length Lb decreases with increase in the inclination angle of the opposing surface 35c of the brush 35 with respect to the opposing surface 32c of each of the commutator segments 32, and increases with decrease in the inclination angle.

The brush 35 is received in a brush holder 30a in such as manner as to be slidable in the radial direction Y. In the brush holder 30a, there is provided a pressing spring 39 that has an elastic function of pressing the brush 35 against each of the commutator segments 32. The pressing spring 39 may be implemented by, for example, a coil spring or a plate spring. By the pressing spring 39, the opposing surface 35c of the brush 35 is pressed on the opposing surface 32c of each of the commutator segments 32.

In addition, it should be noted that other elastic members having the same elastic function as the pressing spring 39 may be employed instead of the pressing spring 39.

In the case of the length of the opposing surface 35c of the brush 35 in the circumferential direction Z being constant, the contact area between the opposing surface 32c of each of the commutator segments 32 and the opposing surface 35c of the brush 35 is proportional to the sliding length Lb. That is, the contact area between the opposing surface 32c of each of the commutator segments 32 and the opposing surface 35c of the brush 35 increases with increase in the sliding length Lb and decreases with decrease in the sliding length Lb.

It is preferable that the condition of the sliding length Lb being greater than or equal to $\frac{1}{10}$ of the opposing length La is satisfied when the electrical contact device 30E is finally assembled. Therefore, in the case where the above condition is not satisfied, it is necessary to perform a process on the brush 35 to correct partial abutting of the opposing surface 35c of the brush 35 with respect to the opposing surface 32c of each of the commutator segments 32. Here, the term "partial abutting" denotes a state where only a small part of the opposing surface 35c of the brush 35 can make sliding contact with the opposing surface 32c of each of the commutator segments 32.

For example, as the partial-abutting correction process, it is possible to perform a cutting process on the opposing surface 35c of the brush 35 using a cutting jig or actually operating the rotating electric machine 1. By performing the partial-abutting correction process, it is possible to cut or wear the opposing surface 35c of the brush 35 and thereby increase the sliding length Lb relative to the opposing length La until satisfying the above condition.

As above, in the electrical contact device 30E according to the present embodiment, the sliding length Lb is set to be greater than or equal to $\frac{1}{10}$ of the opposing length La. Consequently, it is possible to increase the contact area between each of the first and second brushes 35 and 36 and each of the commutator segments 32, thereby lowering the electric resistance to electric current that flows via the sliding contact therebetween. Further, by lowering the electric resistance, it is possible to reduce the amount of Joule heat generated due to the electric resistance, thereby suppressing production of zinc oxide that may adhere to the opposing surface 32c of each of the commutator segments 32. As a result, even when the rotating electric machine 1 operates under a high-current condition, it is still possible to effectively reduce electromagnetic noise.

In addition, according to the present embodiment, it is also possible to achieve the same advantageous effects as achievable according to the first embodiment.

As a modification to the electrical contact device 30E according to the present embodiment, it is possible to apply the third sliding-contact structure to only one of the first and second brushes 35 and 36.

As another modification, it is possible to employ a sliding-contact structure that is a combination of at least two of the above-described first, second and third sliding-contact structures.

In the above-described tenth to fourteenth embodiments, the electrical contact devices 30A-30E are designed to suppress the adherence of adhering objects to the surfaces of the commutator segments 32, thereby effectively reducing electromagnetic noise under a high-current condition.

From another perspective, the inventors of the present application have found that even when adhering objects have adhered to the surfaces of the commutator segments 32, it is still possible to effectively reduce electromagnetic noise under a high-current condition by suppressing generation of arcs between the commutator segments 32 and the brushes 35 and 36.

Hereinafter, the fifteenth to the twentieth embodiments will be described which are based on the above finding of the inventors.

Fifteenth Embodiment

Figure 19:
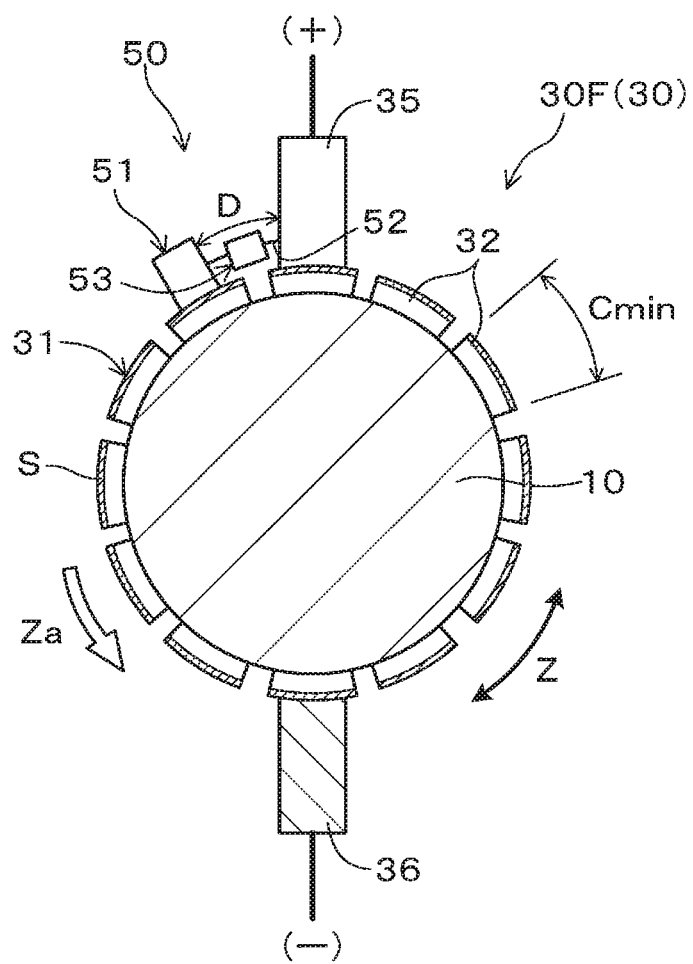
FIG. 19 is a schematic cross sectional view illustrating the configuration of an electrical contact device according to a fifteenth embodiment.
Figure 20:
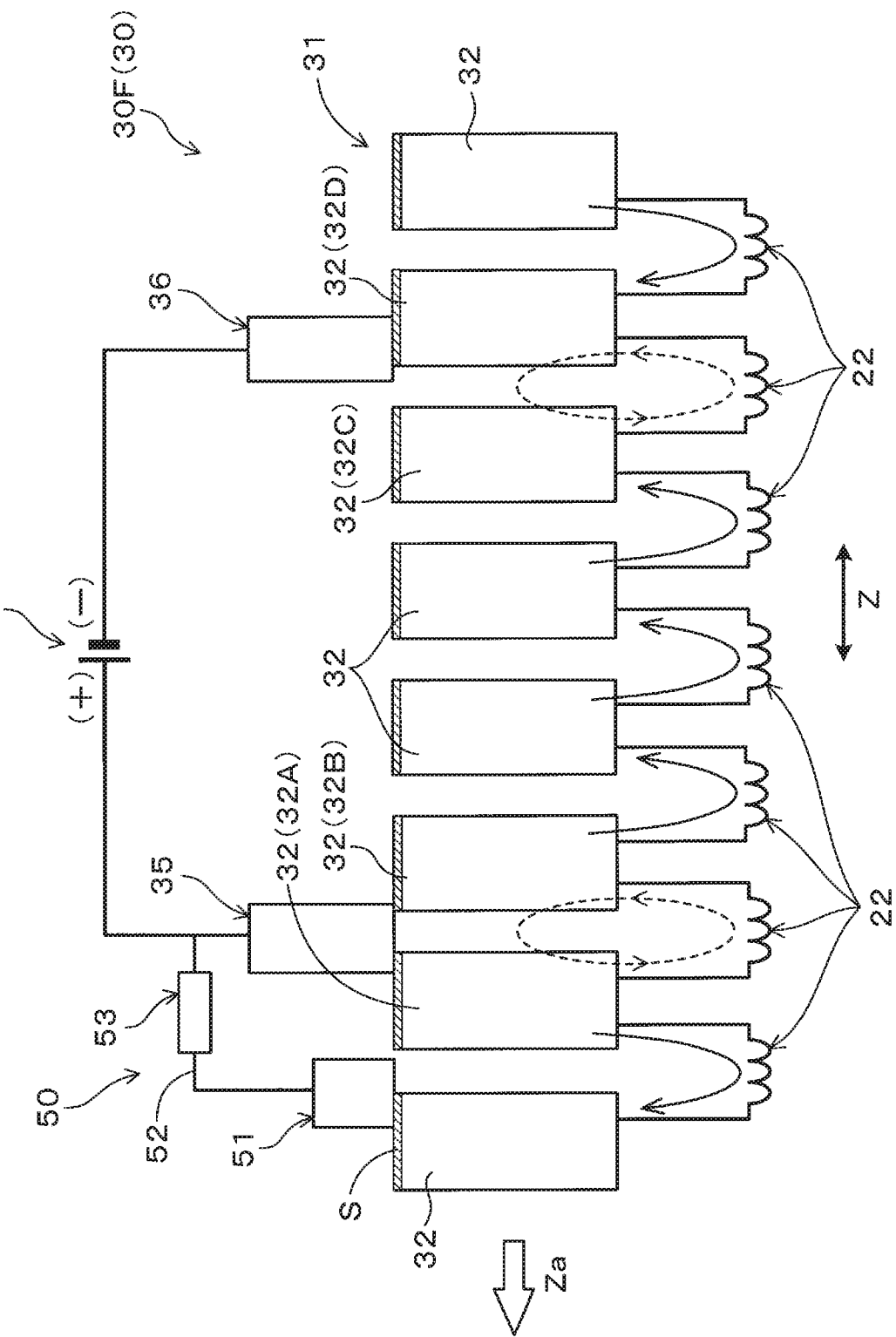
FIG. 20 is a development of commutator segments and brushes which together constitute the electrical contact device according to the fifteenth embodiment.

As shown in FIGS. 19 and 20, an electrical contact device 30F according to the fifteenth embodiment is applied, as a modification of the electrical contact device 30 according to the first embodiment, to the rotating electric machine 1 shown in FIG. 1.

The electrical contact device 30F according to the present embodiment includes an arc energy absorber 50. The arc energy absorber 50 is configured to absorb arc energy on the positive brush 35 side (i.e., the first brush 35 side); the arc energy is produced when the positive brush 35, which is electrically connected with the positive terminal of the electric power supply E, is brought out of sliding contact with any of the commutator segments 32.

Moreover, in the electrical contact device 30F according to the present embodiment, the positive brush (i.e., first brush) 35 is formed copper whereas the negative brush (i.e., second brush) 36 is formed of zinc. In addition, the positive brush 35 may alternatively be formed of zinc as necessary. In this case, zinc oxide S, which is produced by oxidation of the molten zinc, adheres to the surfaces of the commutator segments 32.

The arc energy absorber 50 is configured with an auxiliary brush 51 and a current-conducting member 53.

The auxiliary brush 51 is configured to make sliding contact with one of the commutator segments 32 which is located, in the rotational direction Za, forward of and adjacent to another of the commutator segments 32 which is in sliding contact with the positive brush 35.

Moreover, the auxiliary brush 51 is located forward of the positive brush 35 in the rotational direction Za of the commutator 31 so that a clearance D between the positive brush 35 and the auxiliary brush 51 in the circumferential direction Z is less than a minimum value Cmin of widths of all the commutator segments 32 in the circumferential direction Z.

The current-conducting member 53 is provided in a bypass path 52 that electrically connects the positive brush 35 and the auxiliary brush 51. The current-conducting member 53 is constituted of at least one of a resistor having a higher resistance than the positive brush 35, a diode, a capacitor, a snubber and a varistor.

Figure 21:
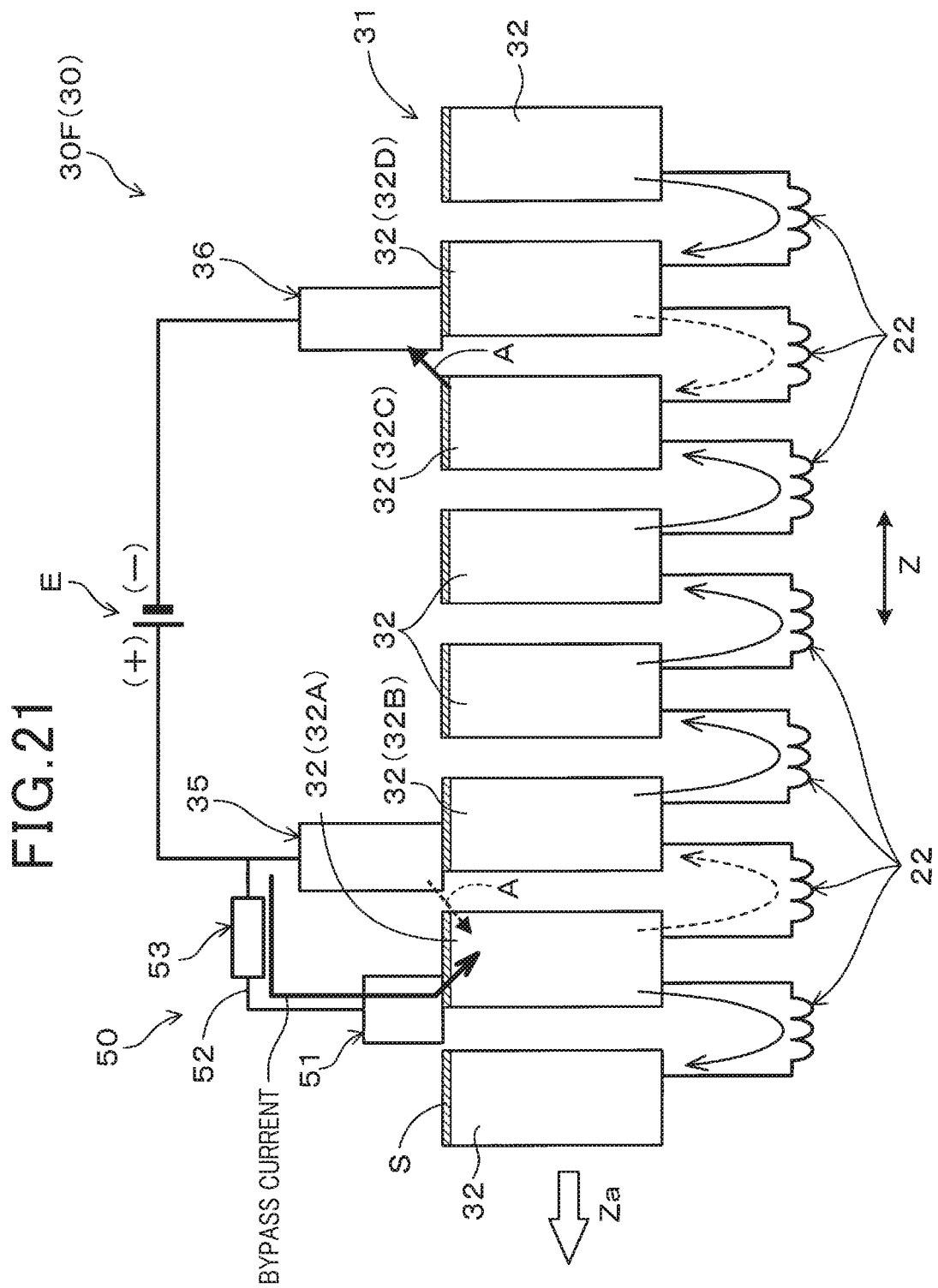
FIG. 21 is an explanatory diagram illustrating the prevention, by an arc energy absorber, of generation of an arc on a positive brush side in the electrical contact device according to the fifteenth embodiment.

Referring now to FIG. 21, the prevention, by the arc energy absorber 50, of generation of an arc in the electrical contact device 30F according to the present embodiment will be described.

As shown in FIG. 21, in the electrical contact device 30F, when the commutator segment 32A is brought out of sliding contact with the positive brush 35 with rotation of the commutator 31 in the rotational direction Za, an arc A would be generated, without the arc energy absorber 50, between the positive brush 35 and the commutator segment 32A as indicated with a dashed-line arrow in FIG. 21. On the other hand, when the commutator segment 32C is brought out of sliding contact with the negative brush 36 with rotation of the commutator 31 in the rotational direction Za, an arc A is generated between the commutator segment 32C and the negative brush 36 as indicated with a solid-line arrow in FIG. 21.

As described above, there is provided the arc energy absorber 50 in the electrical contact device 30F. Therefore, bypass current flows from the positive brush 35 to the commutator segment 32A via the current-conducting member 53 and the auxiliary brush 51 immediately before the commutator segment 32A is brought out of sliding contact with the positive brush 35. Consequently, it becomes possible to cause arc energy on the positive brush 35 side, which is the cause of generation of an arc A, to escape via the bypass path 52, thereby preventing generation of an arc A between the positive brush 35 and the commutator segment 32A.

As above, according to the present embodiment, even when the rotating electric machine 1 operates under a high-current condition with zinc oxide S having adhered to the surfaces of the commutator segments 32, it is still possible to effectively reduce electromagnetic noise by suppressing generation of arcs A in the electrical contact device 30F.

In addition, according to the present embodiment, it is also possible to achieve the same advantageous effects as achievable according to the first embodiment.

Sixteenth Embodiment

An electrical contact device 30G according to the sixteenth embodiment is a modification of the electrical contact device 30F according to the fifteenth embodiment.

Figure 22:
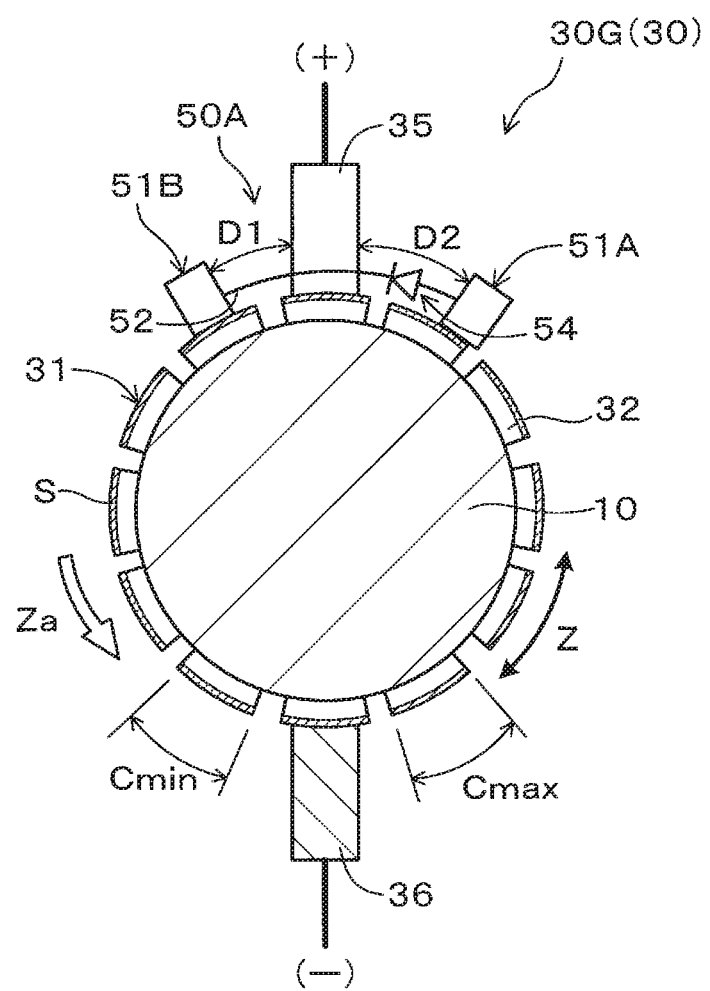
FIG. 22 is a schematic cross sectional view illustrating the configuration of an electrical contact device according to a sixteenth embodiment.

As shown in FIG. 22, the electrical contact device 30G includes an arc energy absorber 50A. Similar to the arc energy absorber 50 described in the fifteenth embodiment, the arc energy absorber 50A is configured to absorb arc energy on the positive brush 35 side which is produced when the positive brush 35 is brought out of sliding contact with any of the commutator segments 32.

Specifically, in the electrical contact device 30G according to the present embodiment, the arc energy absorber 50A is configured with a pair of auxiliary brushes 51A and 51B and a diode 54.

The auxiliary brushes 51A and 51B are configured to respectively make sliding contact with those two of the commutator segments 32 which are located, in the rotational direction Za, adjacent to and respectively on opposite sides of that one of the commutator segments 32 which is in sliding contact with the positive brush 35.

Moreover, the auxiliary brush 51B is located forward of the positive brush 35 in the rotational direction Za so that a clearance D1 between the positive brush 35 and the auxiliary brush 51B in the circumferential direction Z is less than a minimum value Cmin of widths of all the commutator segments 32 in the circumferential direction Z. In contrast, the auxiliary brush 51A is located backward of the positive brush 35 in the rotational direction Za so that a clearance D2 between the positive brush 35 and the auxiliary brush 51A in the circumferential direction Z is greater than a maximum value Cmax of the widths of all the commutator segments 32 in the circumferential direction Z.

The diode 54 is provided in a bypass path 52 that electrically connects the auxiliary brushes 51A and 51B. The diode 54 has its anode electrically connected to the auxiliary brush 51A and its cathode electrically connected to the auxiliary brush 51B.

Figure 23:
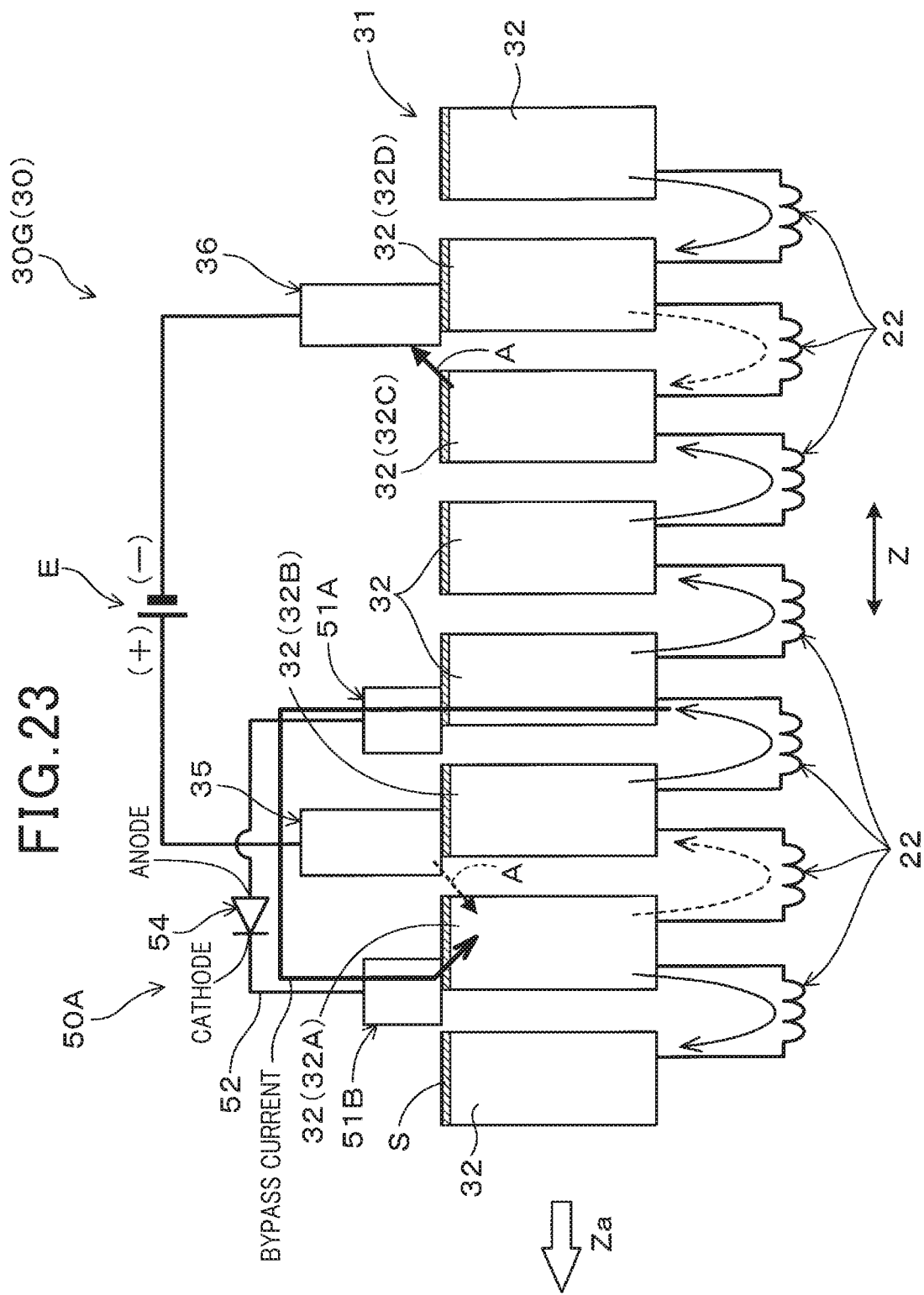
FIG. 23 is an explanatory diagram illustrating the prevention, by an arc energy absorber, of generation of an arc on a positive brush side in the electrical contact device according to the sixteenth embodiment.

Referring now to FIG. 23, the prevention, by the arc energy absorber 50A, of generation of an arc in the electrical contact device 30G according to the present embodiment will be described.

As shown in FIG. 23, in the electrical contact device 30G, when the commutator segment 32A is brought out of sliding contact with the positive brush 35 with rotation of the commutator 31 in the rotational direction Za, an arc A would be generated, without the arc energy absorber 50A, between the positive brush 35 and the commutator segment 32A as indicated with a dashed-line arrow in FIG. 23.

However, as described above, there is provided the arc energy absorber 50A in the electrical contact device 30G. Therefore, bypass current flows from the positive brush 35 to the commutator segment 32A via the auxiliary brush 51A, the diode 54 and the auxiliary brush 51B immediately before the commutator segment 32A is brought out of sliding contact with the positive brush 35. Consequently, it becomes possible to cause arc energy on the positive brush 35 side, which is the cause of generation of an arc A, to escape via the bypass path 52, thereby preventing generation of an arc A between the positive brush 35 and the commutator segment 32A.

As above, according to the present embodiment, even when the rotating electric machine 1 operates under a high-current condition with zinc oxide S having adhered to the surfaces of the commutator segments 32, it is still possible to effectively reduce electromagnetic noise by suppressing generation of arcs A in the electrical contact device 30G.

In addition, according to the present embodiment, it is also possible to achieve the same advantageous effects as achievable according to the first embodiment.

Seventeenth Embodiment

An electrical contact device 30H according to the seventeenth embodiment is a modification of the electrical contact device 30F according to the fifteenth embodiment.

Figure 24:
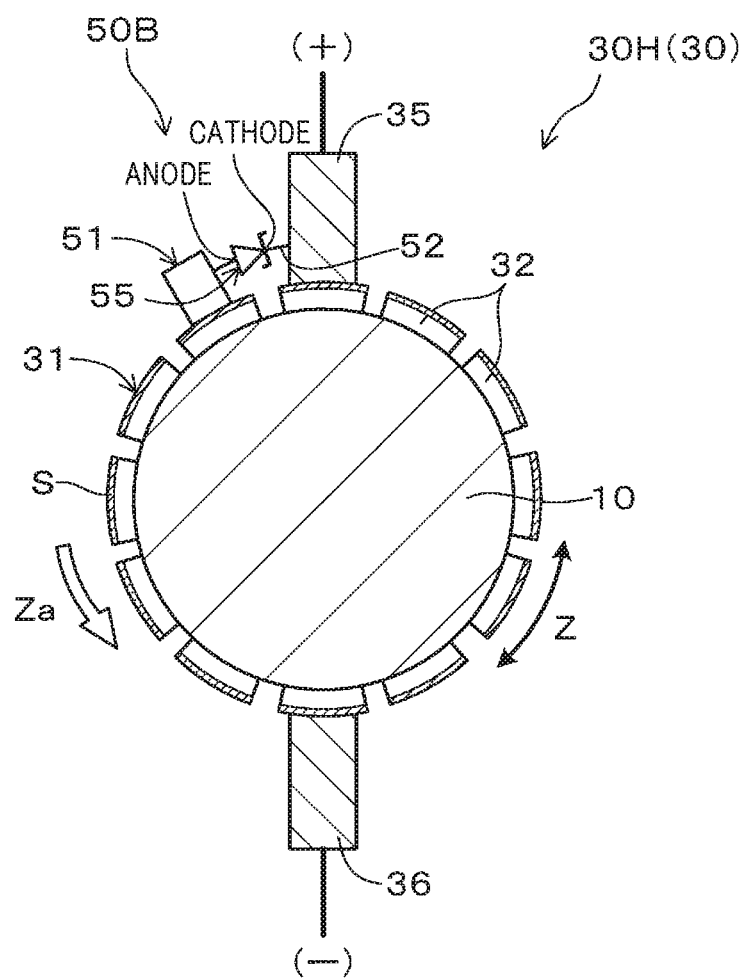
FIG. 24 is a schematic cross sectional view illustrating the configuration of an electrical contact device according to a seventeenth embodiment.

As shown in FIG. 24, the electrical contact device 30H includes an arc energy absorber 50B. Similar to the arc energy absorber 50 described in the fifteenth embodiment, the arc energy absorber 50B is configured to absorb arc energy on the positive brush 35 side which is produced when the positive brush 35 is brought out of sliding contact with any of the commutator segments 32.

Specifically, in the electrical contact device 30H according to the present embodiment, the arc energy absorber 50B is configured with an auxiliary brush 51 and a Zener diode 55.

The auxiliary brush 51 is identical to and located in the same manner as the auxiliary brush 51 of the electrical contact device 30F according to the fifteenth embodiment.

The Zener diode 55 is provided in a bypass path 52 that electrically connects the positive brush 35 and the auxiliary brush 51. The Zener diode 55 has its anode electrically connected to the auxiliary brush 51 and its cathode electrically connected to the positive brush 35. The Zener diode 55 is configured to allow electric current to flow from its cathode to its anode when the reverse voltage (i.e., the difference in electric potential between the positive brush 35 and the auxiliary brush 51) exceeds a preset voltage.

Figure 25:
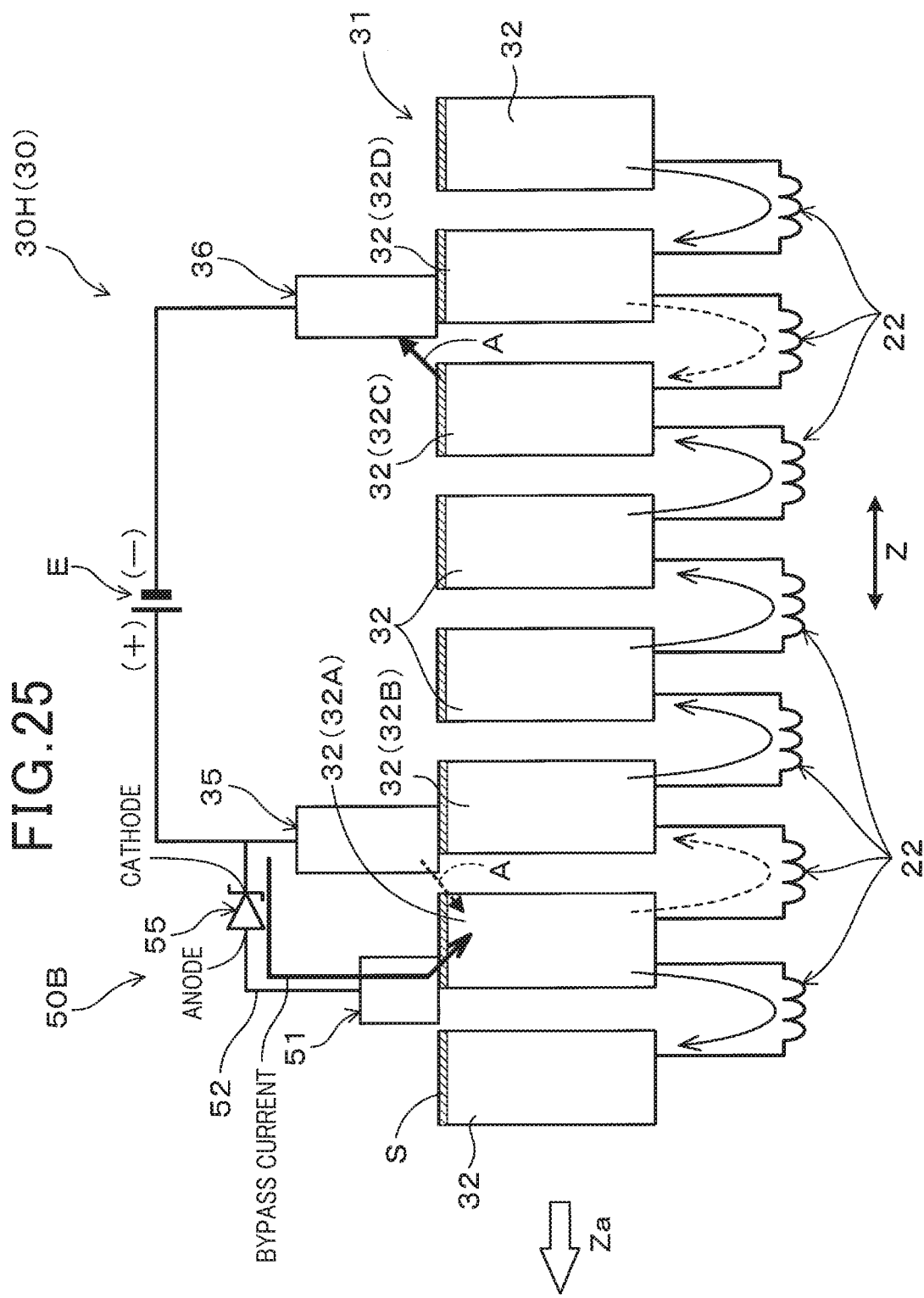
FIG. 25 is an explanatory diagram illustrating the prevention, by an arc energy absorber, of generation of an arc on a positive brush side in the electrical contact device according to the seventeenth embodiment.

Referring now to FIG. 25, the prevention, by the arc energy absorber 50B, of generation of an arc in the electrical contact device 30H according to the present embodiment will be described.

As shown in FIG. 25, in the electrical contact device 30H, when the commutator segment 32A is brought out of sliding contact with the positive brush 35 with rotation of the commutator 31 in the rotational direction Za, an arc A would be generated, without the arc energy absorber 50B, between the positive brush 35 and the commutator segment 32A as indicated with a dashed-line arrow in FIG. 25.

However, as described above, there is provided the arc energy absorber 50B in the electrical contact device 30H. Therefore, bypass current flows from the positive brush 35 to the commutator segment 32A via the Zener diode 55 and the auxiliary brush 51 immediately before the commutator segment 32A is brought out of sliding contact with the positive brush 35. Consequently, it becomes possible to cause arc energy on the positive brush 35 side, which is the cause of generation of an arc A, to escape via the bypass path 52, thereby preventing generation of an arc A between the positive brush 35 and the commutator segment 32A.

As above, according to the present embodiment, even when the rotating electric machine 1 operates under a high-current condition with zinc oxide S having adhered to the surfaces of the commutator segments 32, it is still possible to effectively reduce electromagnetic noise by suppressing generation of arcs A in the electrical contact device 30H.

In addition, according to the present embodiment, it is also possible to achieve the same advantageous effects as achievable according to the first embodiment.

Eighteenth Embodiment

An electrical contact device 30I according to the eighteenth embodiment is a modification of the electrical contact device 30F according to the fifteenth embodiment.

Figure 26:
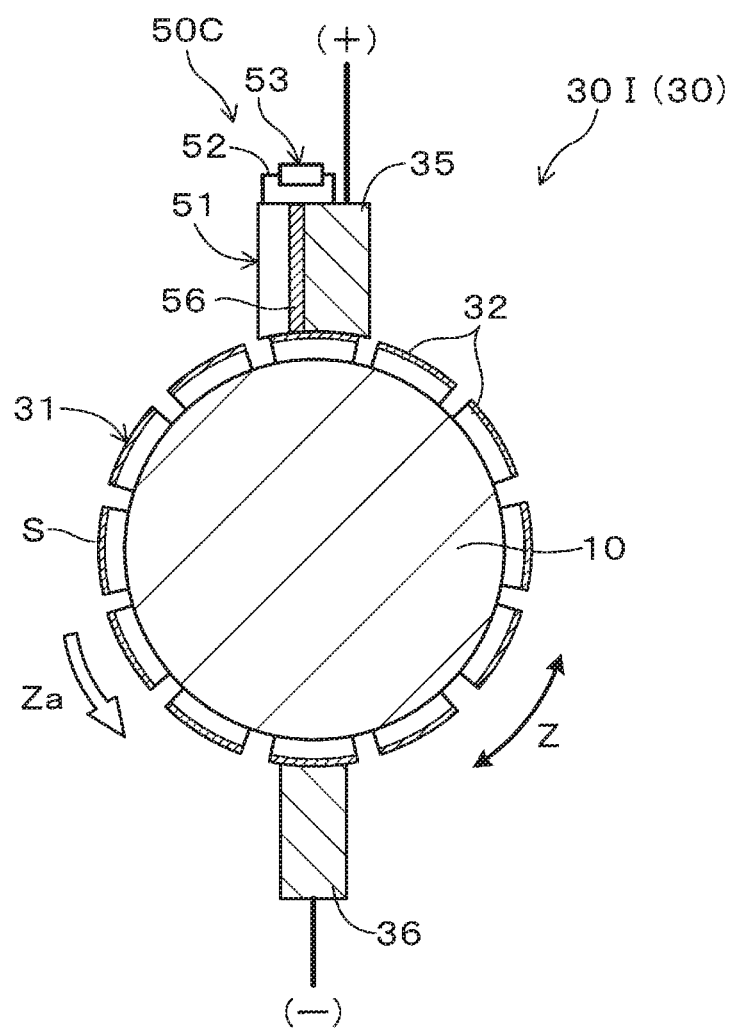
FIG. 26 is a schematic cross sectional view illustrating the configuration of an electrical contact device according to an eighteenth embodiment.

As shown in FIG. 26, the electrical contact device 30I includes an arc energy absorber 50C. Similar to the arc energy absorber 50 described in the fifteenth embodiment, the arc energy absorber 50C is configured to absorb arc energy on the positive brush 35 side which is produced when the positive brush 35 is brought out of sliding contact with any of the commutator segments 32.

Specifically, in the electrical contact device 30I according to the present embodiment, the arc energy absorber 50C is configured with an auxiliary brush 51 and a current-conducting member 53.

The auxiliary brush 51 is located forward of the positive brush 35 in the rotational direction Za of the commutator 31. The auxiliary brush 51 is joined to the positive brush 35 via an electric insulation layer 56; the electric insulation layer 56 is interposed between the auxiliary brush 51 and the positive brush 35 in the circumferential direction Z. Consequently, the auxiliary brush 51 and the positive brush 35 are integrated into one piece.

The current-conducting member 53 is provided in a bypass path 52 that electrically connects the positive brush 35 and the auxiliary brush 51.

According to the present embodiment, it is also possible to achieve the same advantageous effects as achievable according to the fifteenth embodiment.

Moreover, as described above, in the electrical contact device 30I according to the present embodiment, the auxiliary brush 51 and the positive brush 35 are integrated into one piece. Consequently, it becomes to reduce the number of the brushes and thus the number of components accompanying the brushes (e.g., the brush holders and the pressing springs), thereby lowering the manufacturing cost of the electrical contact device 30I. Moreover, it also becomes possible to minimize the size of the arc energy absorber 50C.

Nineteenth Embodiment

An electrical contact device 30J according to the nineteenth embodiment is a modification of the electrical contact device 30G according to the sixteenth embodiment.

Figure 27:
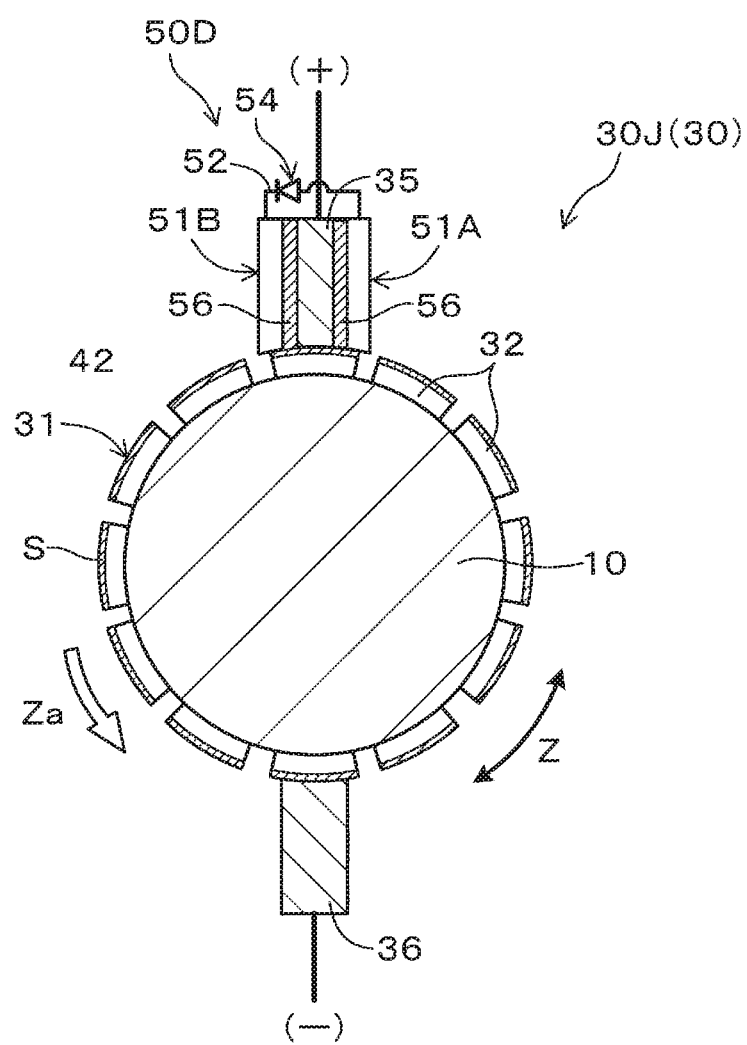
FIG. 27 is a schematic cross sectional view illustrating the configuration of an electrical contact device according to a nineteenth embodiment.

As shown in FIG. 27, the electrical contact device 30J includes an arc energy absorber 50D. Similar to the arc energy absorber 50A described in the sixteenth embodiment, the arc energy absorber 50D is configured to absorb arc energy on the positive brush 35 side which is produced when the positive brush 35 is brought out of sliding contact with any of the commutator segments 32.

Specifically, in the electrical contact device 30J according to the present embodiment, the arc energy absorber 50D is configured with a pair of auxiliary brushes 51A and 51B and a diode 54.

The auxiliary brush 51B is located forward of the positive brush 35 in the rotational direction Za while the auxiliary brush 51A is located backward of the positive brush 35 in the rotational direction Za. The auxiliary brush 51A is joined to the positive brush 35 via an electric insulation layer 56; the electric insulation layer 56 is interposed between the auxiliary brush 51A and the positive brush 35 in the circumferential direction Z. Similarly, the auxiliary brush 51B is also joined to the positive brush 35 via an electric insulation layer 56; the electric insulation layer 56 is interposed between the auxiliary brush 51B and the positive brush 35 in the circumferential direction Z. Consequently, the auxiliary brushes 51A and 51B and the positive brush 35 are integrated into one piece.

The diode 54 is provided in a bypass path 52 that electrically connects the auxiliary brushes 51A and 51B. The diode 54 has its anode electrically connected to the auxiliary brush 51A and its cathode electrically connected to the auxiliary brush 51B.

According to the present embodiment, it is also possible to achieve the same advantageous effects as achievable according to the sixteenth embodiment.

Moreover, as described above, in the electrical contact device 30J according to the present embodiment, the auxiliary brushes 51A and 51B and the positive brush 35 are integrated into one piece. Consequently, it becomes to reduce the number of the brushes and thus the number of components accompanying the brushes (e.g., the brush holders and the pressing springs), thereby lowering the manufacturing cost of the electrical contact device 30J. Moreover, it also becomes possible to minimize the size of the arc energy absorber 50D.

In the above-described electrical contact devices 30F-30J according to the fifteenth to the nineteenth embodiments, the arc energy absorbers 50 and 50A-50D are provided only on the positive brush 35 side. However, as an alternative, the arc energy absorbers 50 and 50A-50D may be provided on the negative brush 36 side as well as on the positive brush 35 side. In this case, it is possible to more effectively reduce electromagnetic noise.

In addition, it is known that electromagnetic noise due to arcs generated on the negative brush 36 side is lower than electromagnetic noise due to arcs generated on the positive brush 35 side. Therefore, in terms of lowering the manufacturing costs of the electrical contact devices 30F-30J, it is preferable to provide the arc energy absorbers 50 and 50A-50D only on the positive brush 35 side.

Twentieth Embodiment

An electrical contact device 30K according to the twentieth embodiment is a modification of the electrical contact device 30F according to the fifteenth embodiment.

Figure 28:
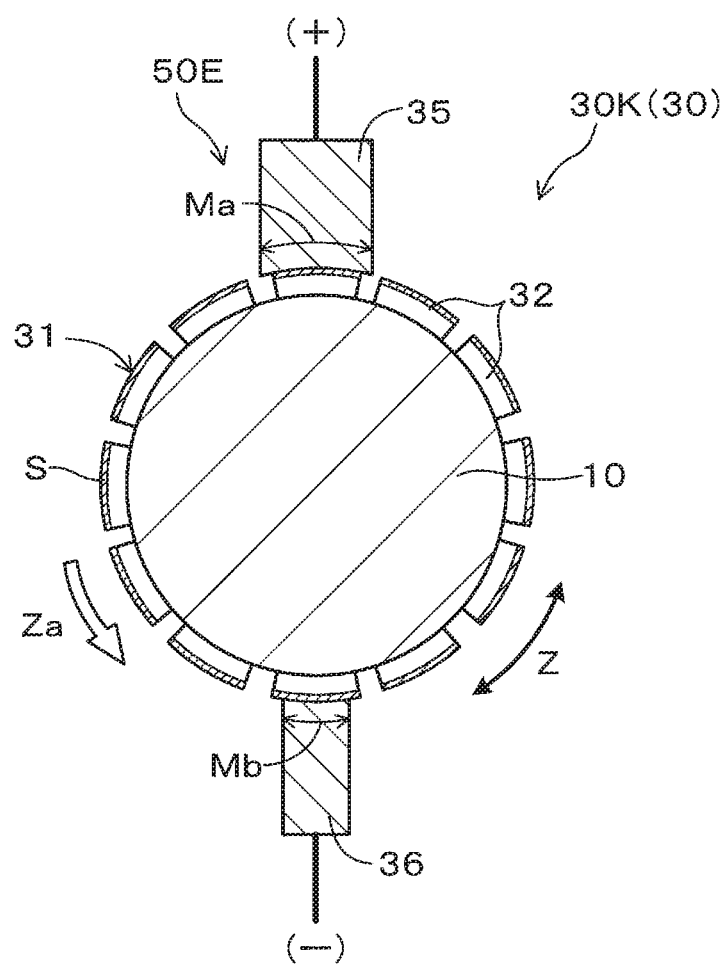
FIG. 28 is a schematic cross sectional view illustrating the configuration of an electrical contact device according to a twentieth embodiment.

As shown in FIG. 28, the electrical contact device 30K includes an arc energy absorber 50E. The arc energy absorber 50E is configured so that a sliding length Ma of the positive brush 35 in the circumferential direction Z is greater than a sliding length Mb of the negative brush 36 in the circumferential direction Z.

According to the present embodiment, it is also possible to achieve the same advantageous effects as achievable according to the fifteenth embodiment.

Moreover, as described above, in the electrical contact device 30K according to the present embodiment, the sliding length Ma of the positive brush 35 is set to be greater than the sliding length Mb of the negative brush 36. Consequently, it becomes possible to extend the time for which the positive brush 35 is in sliding contact with one adjacent pair of the commutator segments 32 and thereby short-circuits the coil connected between the adjacent pair of the commutator segments 32 (see FIG. 20); thus it becomes possible to increase the amount of arc energy consumed as heat. As a result, even when the rotating electric machine 1 operates under a high-current condition with zinc oxide S having adhered to the surfaces of the commutator segments 32, it is still possible to effectively reduce electromagnetic noise by suppressing generation of arcs A in the electrical contact device 30K.

While the above particular embodiments have been shown and described, it will be understood by those skilled in the art that various modifications, changes, and improvements may be made without departing from the spirit of the present disclosure.

For example, in the above-described embodiments, zinc is employed as the low-boiling point material. Alternatively, other materials (e.g., magnesium) whose boiling points are lower than the boiling point of copper (i.e., 2562° C.) may be employed as the low-boiling point material.

In the above-described embodiments, the mixed material is constituted mainly of zinc and the lubricant. Alternatively, the mixed material may contain, as its major components, the lubricant and/or other materials than the lubricant in addition to zinc.

What is claimed is:

1. An electrical contact device comprising:
a first electric potential-side contact; and
a second electric potential-side contact having a lower electric potential than the first electric potential-side contact,
wherein
the first electric potential-side contact and the second electric potential-side contact are configured to be brought into and out of contact with each other,
at least one of the first electric potential-side contact and the second electric potential-side contact is formed of zinc or a mixed material that contains zinc, but no copper, and
a percentage content of zinc in the mixed material is greater than or equal to 25% by weight.

2. The electrical contact device as set forth in claim 1, wherein both the first electric potential-side contact and the second electric potential-side contact are formed of zinc or the mixed material that contains zinc.

3. The electrical contact device as set forth in claim 1, wherein either one of the first electric potential-side contact and the second electric potential-side contact is formed of zinc or the mixed material that contains zinc.

4. The electrical contact device as set forth in claim 1, wherein the mixed material is constituted mainly of zinc, and a lubricant.

5. The electrical contact device as set forth in claim 4, wherein the lubricant is carbon.

6. A rotating electric machine comprising:
a rotating shaft;
a rotor fixed on the rotating shaft, the rotor including a rotor core and an armature coil wound on the rotor core;
a commutator electrically connected with the armature coil and configured to rotate with the rotating shaft and the rotor, the commutator being comprised of a plurality of commutator segments that are arranged in a circumferential direction of the rotating shaft;
a field magnet that provides a magnetic field to the armature coil; and
a plurality of brushes electrically connected with an electric power supply and configured to make sliding contact with the commutator segments during rotation of the commutator; and
the electrical contact device as set forth in claim 1,
wherein
the first electric potential-side contact and the second electric potential-side contact of the electrical contact device are constituted of one of the commutator segments and one of the brushes.

7. The rotating electric machine as set forth in claim 6, wherein all of the brushes are formed of zinc or the mixed material that contains zinc.

8. The rotating electric machine as set forth in claim 6, wherein each of the commutator segments has a sliding-contact starting portion and a sliding-contact finishing portion with respect to each of the brushes during rotation of the commutator, and
at least one of the sliding-contact starting portion and the sliding-contact finishing portion is formed of zinc or the mixed material that contains zinc.

9. The rotating electric machine as set forth in claim 6, wherein at least one of the brushes contains an abrasive and is configured to make sliding contact with each of the commutator segments via the abrasive.

10. The rotating electric machine as set forth in claim 9, wherein the abrasive is constituted of at least one of silicon carbide and meso-carbon powder.

11. The rotating electric machine as set forth in claim 9, wherein the percentage content of the abrasive in the at least one of the brushes is lower than or equal to 10% by weight.

12. The rotating electric machine as set forth in claim 6, wherein each of the commutator segments has a sliding surface on which each of the brushes slides during rotation of the commutator, and on the sliding surface, there is formed a plated layer of at least one material selected from silver, nickel and palladium.

13. The rotating electric machine as set forth in claim 6, wherein at least one of the brushes has a sliding length greater than or equal to ¹⁄₁₀ of an opposing length, the sliding length being a length in an axial direction of the rotating shaft for which the at least one of the brushes actually makes sliding contact with each of the commutator segments, the opposing length being a length in the axial direction of the rotating shaft for which the at least one of the brushes slidably opposes each of the commutator segments.

14. The rotating electric machine as set forth in claim 6, wherein the brushes comprise a positive brush electrically connected with a positive terminal of the electric power supply, and
the rotating electric machine further comprises an arc energy absorber that is configured to absorb arc energy on the positive brush side which is produced when the positive brush is brought out of sliding contact with any of the commutator segments.

15. The rotating electric machine as set forth in claim 14, wherein the arc energy absorber is configured with an auxiliary brush and a current-conducting member, the auxiliary brush is configured to make sliding contact with one of the commutator segments which is located, in a rotational direction of the commutator, forward of and adjacent to another of the commutator segments which is in sliding contact with the positive brush,
the auxiliary brush is located forward of the positive brush in the rotational direction of the commutator so that a clearance between the positive brush and the auxiliary brush in the circumferential direction is less than a minimum value of widths of all the commutator segments in the circumferential direction,
the current-conducting member is provided in a bypass path that electrically connects the positive brush and the auxiliary brush, and
the current-conducting member is constituted of at least one of a resistor having a higher resistance than the positive brush, a diode, a capacitor, a snubber and a varistor.

16. The rotating electric machine as set forth in claim 15, wherein the current-conducting member is constituted of a Zener diode that has its anode electrically connected to the auxiliary brush and its cathode electrically connected to the positive brush.

17. The rotating electric machine as set forth in claim 15, wherein the auxiliary brush is joined to the positive brush via an electric insulation layer so that the auxiliary brush and the positive brush are integrated into one piece.

18. The rotating electric machine as set forth in claim 14, wherein the arc energy absorber is configured with a pair of front and rear auxiliary brushes and a diode,
the front and rear auxiliary brushes are configured to respectively make sliding contact with those two of the commutator segments which are located, in a rotational direction of the commutator, adjacent to and respectively on opposite sides of that one of the commutator segments which is in sliding contact with the positive brush,
the front auxiliary brush is located forward of the positive brush in the rotational direction so that a clearance between the positive brush and the front auxiliary brush in the circumferential direction is less than a minimum value of widths of all the commutator segments in the circumferential direction,
the rear auxiliary brush is located backward of the positive brush in the rotational direction so that a clearance between the positive brush and the rear auxiliary brush in the circumferential direction is greater than a maximum value of the widths of all the commutator segments in the circumferential direction,
the diode is provided in a bypass path that electrically connects the front and rear auxiliary brushes, and
the diode has its anode electrically connected to the rear auxiliary brush and its cathode electrically connected to the front auxiliary brush.

19. The rotating electric machine as set forth in claim 14, wherein the brushes also comprise a negative brush electrically connected with a negative terminal of the electric power supply, and
the arc energy absorber is configured so that a sliding length of the positive brush in the circumferential direction is greater than a sliding length of the negative brush in the circumferential direction.

20. The rotating electric machine as set forth in claim 6, wherein all of the commutator segments are formed of neither zinc nor the mixed material that contains zinc.

* * * * *